United States Patent
Yamashita et al.

(10) Patent No.: US 12,202,939 B2
(45) Date of Patent: Jan. 21, 2025

(54) FLUOROPOLYETHER GROUP-INCLUDING COMPOUND

(71) Applicant: DAIKIN INDUSTRIES, LTD., Osaka (JP)

(72) Inventors: Tsuneo Yamashita, Osaka (JP); Hisashi Mitsuhashi, Osaka (JP); Takeshi Maehira, Osaka (JP); Yoshimi Motonari, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 572 days.

(21) Appl. No.: 17/485,611

(22) Filed: Sep. 27, 2021

(65) Prior Publication Data

US 2022/0010063 A1 Jan. 13, 2022

Related U.S. Application Data

(63) Continuation of application No. PCT/JP2020/013783, filed on Mar. 26, 2020.

(30) Foreign Application Priority Data

Mar. 29, 2019 (JP) .................................. 2019-066338

(51) Int. Cl.
| | |
|---|---|
| C08G 65/336 | (2006.01) |
| C08G 65/332 | (2006.01) |
| C08G 65/333 | (2006.01) |
| C09D 171/00 | (2006.01) |

(52) U.S. Cl.
CPC ....... C08G 65/336 (2013.01); C08G 65/3322 (2013.01); C08G 65/33324 (2013.01); C09D 171/00 (2013.01)

(58) Field of Classification Search
CPC ............ C08G 65/336; C08G 65/33324; C08G 65/007
See application file for complete search history.

(56) References Cited

U.S. PATENT DOCUMENTS

| | | | |
|---|---|---|---|
| 6,200,684 B1 | 3/2001 | Yamaguchi et al. | |
| 2019/0002635 A1 | 1/2019 | Mitsuhashi et al. | |
| 2020/0002551 A1 | 1/2020 | Mitsuhashi et al. | |
| 2021/0214495 A1 * | 7/2021 | Chen .................... | C09D 171/02 |

FOREIGN PATENT DOCUMENTS

| | | | | |
|---|---|---|---|---|
| CN | 107428786 A | 12/2017 | | |
| CN | 109072049 A | 12/2018 | | |
| JP | 2000-327772 A | 11/2000 | | |
| WO | WO-2009008380 A1 * | 1/2009 | ............ | C07F 7/1804 |
| WO | 2018/143433 A1 | 8/2018 | | |
| WO | 2019/203320 A1 | 10/2019 | | |
| WO | WO-2019218399 A1 * | 11/2019 | ......... | B29D 35/0018 |

OTHER PUBLICATIONS

International Search Report for PCT/JP2020/013783 dated Jun. 16, 2020 (PCT/ISA/210).
International Preliminary Report on Patentability with translation of Written Opinion dated Oct. 14, 2021 from the International Bureau in International Application No. PCT/JP2020/013783.
Extended European Search Report dated Nov. 9, 2022 in corresponding European Application No. 20782206.5.

* cited by examiner

*Primary Examiner* — Alexander R Pagano
*Assistant Examiner* — Frank S. Hou
(74) *Attorney, Agent, or Firm* — Sughrue Mion, PLLC

(57) ABSTRACT

A fluoropolyether group-containing compound of formula (1) or (2):

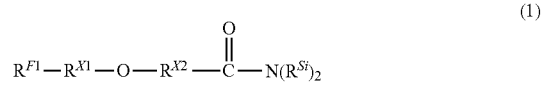

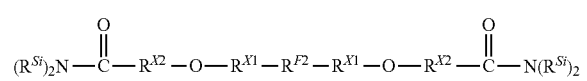

wherein $R^{F1}$, $R^{X1}$, $R^{X2}$ and $R^{Si}$ are as defined herein.

7 Claims, No Drawings

US 12,202,939 B2

FLUOROPOLYETHER GROUP-INCLUDING COMPOUND

CROSS REFERENCE TO RELATED APPLICATIONS

This application is a Rule 53(b) Continuation of International Application No. PCT/JP2020/013783 filed Mar. 26, 2020, claiming priority based on Japanese Patent Application No. 2019-066338 filed Mar. 29, 2019, the respective disclosures of which are incorporated herein by reference in their entirety.

TECHNICAL FIELD

The present disclosure relates to a fluoropolyether group-containing compound.

BACKGROUND ART

Certain types of fluorine-containing silane compounds are known to be capable of providing excellent water-repellency, oil-repellency, antifouling properties, and the like when used in surface treatment of a substrate. A layer obtained from a surface-treating agent containing a fluorine-containing silane compound (hereinafter, also referred to as a "surface-treating layer") is applied as a so-called functional thin film to a large variety of substrates such as glass, plastics, fibers, and building materials.

A known such fluorine-containing compound is a fluoropolyether group-containing silane compound having a fluoropolyether group in the molecular backbone and a hydrolyzable group bonding to a Si atom at the molecular terminal or in the terminal part (Patent Literature 1).

PRIOR ART LITERATURE

Patent Literature

Patent Literature 1: JP 2000-327772 A

Summary Solution to Problem

The present disclosure provides [1] below. [1] A fluoropolyether group-containing compound of formula (1) or (2) below:

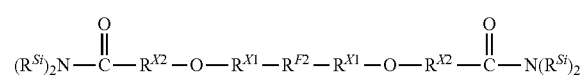

wherein
$R^{F1}$ is $Rf^1-R^F-O_q-$;
$RF^2$ is $-Rf^2_p-R^F-O_q-$;
$Rf^1$ is a $C_{1-16}$ alkyl group optionally substituted with one or more fluorine atoms;
$Rf^2$ is a $C_{1-6}$ alkylene group optionally substituted with one or more fluorine atoms;

$R^F$ is each independently at each occurrence a group represented by formula:

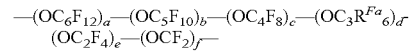

a, b, c, d, e, and f are each independently an integer of 0 to 200, and the sum of a, b, c, d, e, and f is 1 or more, and the occurrence order of each repeating unit enclosed in parentheses provided with a, b, c, d, e, or f is not limited in the formula;
$R^{Fa}$ is each independently at each occurrence a hydrogen atom, a fluorine atom, or a chlorine atom;
p is 0 or 1;
q is independently 0 or 1;
$R^{X1}$ is each independently at each occurrence a $C_{1-6}$ alkylene group;
$R^{X2}$ is each independently at each occurrence a $C_{1-6}$ alkylene group optionally substituted with a $C_{1-6}$ alkyl group or cyclic alkyl group optionally containing one or more nitrogen atoms, oxygen atoms, sulfur atoms, or silicon atoms, or with a perfluoroalkyl group;
$R^{Si}$ is each independently at each occurrence represented by formula (S1) below:

 (S1)

$X^1$ is each independently at each occurrence a single bond, an oxygen atom, or a divalent organic group;
$R^{a1}$ is each independently at each occurrence $-Z^{1'}-SiR^{a1'}_{p1'}R^{b1'}_{q1'}R^{c1'}_{r1'}$;
$Z^{1'}$ is each independently at each occurrence a single bond, an oxygen atom, or a divalent organic group;
$R^{a1'}$ is each independently at each occurrence $-Z^{1''}-SiR^{a1''}_{p1''}R^{b1''}_{q1''}R^{c1''}_{r1''}$;
$Z^{1''}$ is each independently at each occurrence a single bond, an oxygen atom, or a divalent organic group;
$R^{a1''}$ is each independently at each occurrence $-Z^{1'''}-SiR^{b1'''}_{q1'''}R^{c1'''}_{r1'''}$;
$Z^{1'''}$ is each independently at each occurrence a single bond, an oxygen atom, or a divalent organic group;
$R^{b1'''}$ is each independently at each occurrence a hydroxyl group or a hydrolyzable group;
$R^{c1'''}$ is each independently at each occurrence a hydrogen atom or a monovalent organic group;
q1''' is each independently at each occurrence an integer of 0 to 3;
r1''' is each independently at each occurrence an integer of 0 to 3;
$R^{b1''}$ is each independently at each occurrence a hydroxyl group or a hydrolyzable group;
$R^{c1''}$ is each independently at each occurrence a hydrogen atom or a monovalent organic group;
p1'' is each independently at each occurrence an integer of 0 to 3;
q1'' is each independently at each occurrence an integer of 0 to 3;
r1'' is each independently at each occurrence an integer of 0 to 3;
$R^{b1'}$ is each independently at each occurrence a hydroxyl group or a hydrolyzable group;
$R^{c1'}$ is each independently at each occurrence a hydrogen atom or a monovalent organic group;
p1' is each independently at each occurrence an integer of 0 to 3;
q1' is each independently at each occurrence an integer of 0 to 3;
r1' is each independently at each occurrence an integer of 0 to 3;

$R^{b1}$ is each independently at each occurrence a hydroxyl group or a hydrolyzable group;

$R^{c1}$ is each independently at each occurrence a hydrogen atom or a monovalent organic group;

p1 is each independently at each occurrence an integer of 0 to 3;

q1 is each independently at each occurrence an integer of 0 to 3;

r1 is each independently at each occurrence an integer of 0 to 3; and at least one $R^{b1}$, $R^{b1'}$, $R^{b1''}$, or $R^{b1'''}$ is present for each group represented by $R^{Si}$.

Advantageous Effect

According to the present disclosure, a fluoropolyether group-containing compound usable in the formation of a surface-treating layer having better friction durability can be provided.

DESCRIPTION OF EMBODIMENTS

The term "monovalent organic group" as used herein represents a carbon-containing monovalent group. The monovalent organic group is not limited, and may be a hydrocarbon group or a derivative thereof. A derivative of a hydrocarbon group means a group having one or more of N, O, S, Si, amide, sulfonyl, siloxane, carbonyl, carbonyloxy, and the like at the terminal or in the molecular chain of the hydrocarbon group.

The "divalent organic group" as used herein is not limited, and examples include a divalent group obtained by removing one more hydrogen atom from the hydrocarbon group.

The term "hydrocarbon group" as used herein represents a group that contains carbon and hydrogen and that is obtained by removing one hydrogen atom from a molecule. The hydrocarbon group is not limited, and examples include a hydrocarbon group that has 1 to 20 carbon atoms and that is optionally substituted with one or more substituents, such as an aliphatic hydrocarbon group and an aromatic hydrocarbon group. The "aliphatic hydrocarbon group" may be either straight, branched, or cyclic, and may be either saturated or unsaturated. The hydrocarbon group may contain one or more ring structures. The hydrocarbon group may have one or more of N, O, S, Si, amide, sulfonyl, siloxane, carbonyl, carbonyloxy, and the like at the terminal or in the molecular chain thereof.

The substituent of the "hydrocarbon group" as used herein is not limited, and examples include one or more groups selected from a halogen atom, and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group, and a 5 to 10-membered heteroaryl group each optionally substituted with one or more halogen atoms.

Herein, the alkyl group and the phenyl group may be substituted or unsubstituted, unless specified otherwise. A substituent of such a group is not limited, and examples include one or more groups selected from a halogen atom, a $C_{1-6}$ alkyl group, a $C_{2-6}$ alkenyl group, and a $C_{2-6}$ alkynyl group.

The term "hydrolyzable group" as used herein represents a group which is able to undergo a hydrolysis reaction, i.e., represents a group that can be removed from the main backbone of a compound by a hydrolysis reaction. Examples of the hydrolyzable group include —$OR^h$, —$OCOR^h$, —O—N=$CR^h{}_2$, —$NR^h{}_2$, —$NHR^h$, and halogen (in these formulae, $R^h$ represents a substituted or unsubstituted $C_{1-4}$ alkyl group).

The fluoropolyether group-containing compound of the present disclosure is a compound represented by formula (1) or (2) below:

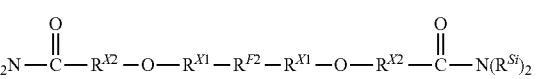

In formula (1), $R^{F1}$ is each independently at each occurrence $R^{f1}$-$R^F$-$O_q$—.

In formula (2), $R^{F2}$ is -$R^{f2}{}_p$-$R^F$-$O_q$—.

In the formula, $R^{f1}$ is each independently at each occurrence a $C_{1-16}$ alkyl group optionally substituted with one or more fluorine atoms.

The "$C_{1-16}$ alkyl group" as in the $C_{1-16}$ alkyl group optionally substituted with one or more fluorine atoms may be straight or branched, and is preferably a straight or branched $C_{1-6}$ alkyl group and in particular $C_{1-3}$ alkyl group, and more preferably a straight $C_{1-6}$ alkyl group and in particular $C_{1-3}$ alkyl group.

$R^{f1}$ is preferably a $C_{1-16}$ alkyl group substituted with one or more fluorine atoms, more preferably a $CF_2H$—$C_{1-15}$ perfluoroalkylene group, and even more preferably a $C_{1-16}$ perfluoroalkyl group.

The $C_{1-16}$ perfluoroalkyl group may be straight or branched, and is preferably a straight or branched $C_{1-6}$ perfluoroalkyl group and in particular $C_{1-3}$ perfluoroalkyl group, more preferably a straight $C_{1-6}$ perfluoroalkyl group and in particular $C_{1-3}$ perfluoroalkyl group, and specifically —$CF_3$, —$CF_2CF_3$, or —$CF_2CF_2CF_3$.

In the formula, $R^{f2}$ is a $C_{1-6}$ alkylene group optionally substituted with one or more fluorine atoms.

The "$C_{1-6}$ alkylene group" as in the $C_{1-6}$ alkylene group optionally substituted with one or more fluorine atoms may be straight or branched, and is preferably a straight or branched $C_{1-3}$ alkylene group, and more preferably a straight $C_{1-3}$ alkylene group.

$R^{f2}$ is preferably a $C_{1-6}$ alkylene group substituted with one or more fluorine atoms, more preferably a $C_{1-6}$ perfluoroalkylene group, and even more preferably a $C_{1-3}$ perfluoroalkylene group.

The $C_{1-6}$ perfluoroalkylene group may be straight or branched, and is preferably a straight or branched $C_{1-3}$ perfluoroalkylene group, more preferably a straight $C_{1-3}$ perfluoroalkyl group, and specifically —$CF_2$—, —$CF_2CF_2$—, or —$CF_2CF_2CF_2$—.

In the formulae, p is 0 or 1. In one embodiment, p is 0. In another embodiment, p is 1.

In the formulae, q is each independently at each occurrence 0 or 1. In one embodiment, q is 0. In another embodiment, q is 1.

In formulae (1) and (2), $R^F$ is each independently at each occurrence a fluoropolyether group represented by the following formula. As for the structure referred to as $R^F$, the left side is bonded to a structure represented by $R^{f1}$ in formula (1), and the left side is bonded to a structure represented by $Rf^2{}_p$ in formula (2).

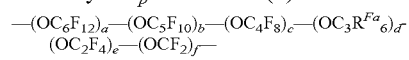

wherein $R^{Fa}$ is each independently at each occurrence a hydrogen atom, a fluorine atom, or a chlorine atom;

a, b, c, d, e, and f are each independently an integer of 0 to 200; the sum of a, b, c, d, e, and f is 1 or more; and the occurrence order of each repeating unit enclosed in parentheses provided with a, b, c, d, e, or f is not limited in the formula.

$R^{Fa}$ is preferably a hydrogen atom or a fluorine atom, and more preferably a fluorine atom.

a, b, c, d, e, and f may be preferably each independently an integer of 0 to 100.

The sum of a, b, c, d, e, and f is preferably 5 or more and more preferably 10 or more, and may be, for example, 15 or more or 20 or more. The sum of a, b, c, d, e, and f is preferably 200 or less, more preferably 100 or less, even more preferably 60 or less, such as 50 or less or 30 or less.

These repeating units may be straight or branched, and are preferably straight. For example, $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$, or the like, and is preferably $-(OCF_2CF_2CF_2CF_2CF_2)-$. $-(OC_5F_{10})-$ may be $-(OCF_2CF_2CF_2CF_2CF_2)-$, $-(OCF(CF_3)CF_2CF_2CF_2)-$, $-(OCF_2CF(CF_3)CF_2CF_2)-$, $-(OCF_2CF_2CF(CF_3)CF_2)-$, $-(OCF_2CF_2CF_2CF(CF_3))-$, or the like, and is preferably $-(OCF_2CF_2CF_2CF_2)-$. $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$, and $-(OCF_2CF(C_2F_5))-$, and is preferably $-(OCF_2CF_2CF_2CF_2)-$. $-(OC_3F_6)-$ (that is to say, in the formula, $R^{Fa}$ is a fluorine atom) may be any of $-(OCF_2CF_2CF_2)-$, $-(OCF(CF_3)CF_2)-$, and $-(OCF_2CF(CF_3))-$, and is preferably $-(OCF_2CF_2CF_2)-$. Also, $-(OC_2F_4)-$ may be any of $-(OCF_2CF_2)-$ and $-(OCF(CF_3))-$, and is preferably $-(OCF_2CF_2)-$.

In one embodiment, $R^F$ is each independently at each occurrence a group represented by formula (f1), (f2), or (f3):

$$-(OC_3F_6)_d- \quad (f1)$$

wherein d is an integer of 1 to 200;

$$-(OC_4F_8)_c-(OC_3F_6)_d-(OC_2F_4)_e-(OCF_2)_f- \quad (f2)$$

wherein c and d are each independently an integer of 0 or more and 30 or less, e and f are each independently an integer of 1 or more and 200 or less, the sum of c, d, e, and f is 2 or more, and the occurrence order of each repeating unit enclosed in parentheses provided with a subscript c, d, e, or f is not limited in the formula;

$$-(R^6-R^7)_g- \quad (f3)$$

wherein $R^6$ is $OCF_2$ or $OC_2F_4$.

$R^7$ is a group selected from $OC_2F_4$, $OC_3F_6$, $OC_4F_8$, $OC_5F_{10}$, and $OC_6F_{12}$, or is a combination of two or three groups independently selected from these groups, and g is an integer of 2 to 100;

$$-(OC_6F_{12})_a-(OC_5F_{10})_b-(OC_4F_8)_c-(OC_3F_6)_d-(OC_2F_4)_e-(OCF_2)_f- \quad (f4)$$

wherein e is an integer of 1 or more and 200 or less, a, b, c, d, f are each independently an integer of 0 or more and 200 or less, the sum of a, b, c, d, e, and f is at least 1, and the occurrence order of each repeating unit enclosed in parentheses provided with a, b, c, d, e, or f is not limited in the formula; and $$-(OC_6F_{12})_a-(OC_5F_{10})_b-(OC_4F_8)_c-(OC_3F_6)_d-(OC_2F_4)_e-(OCF_2)_f- \quad (f5)$$

wherein f is an integer of 1 or more and 200 or less, a, b, c, d, and e are each independently an integer of 0 or more and 200 or less, the sum of a, b, c, d, e, and f is at least 1, and the occurrence order of each repeating unit enclosed in parentheses provided with a, b, c, d, e, or f is not limited in the formula.

In formula (f1), d is preferably an integer of 5 to 200, more preferably 10 to 100, and even more preferably 15 to 50, such as 25 to 35. Formula (f1) is preferably a group represented by $-(OCF_2CF_2CF_2)_d-$ or $-(OCF(CF_3)CF_2)_d-$, and is more preferably a group represented by $-(OCF_2CF_2CF_2)_d-$.

In formula (f2), e and f are each independently preferably an integer of 5 or more and 200 or less, and more preferably 10 to 200. The sum of c, d, e, and f is preferably 5 or more and more preferably 10 or more, and may be, for example, 15 or more or 20 or more. In one embodiment, formula (f2) is preferably a group represented by $-(OCF_2CF_2CF_2CF_2)_c-(OCF_2CF_2CF_2)_d-(OCF_2CF_2)_e-(OCF_2)_f-$. In another embodiment, formula (f2) may be a group represented by $-(OC_2F_4)_e-(OCF_2)_f-$.

In formula (f3), $R^6$ is preferably $OC_2F_4$. In formula (f3), $R^7$ is preferably a group selected from $OC_2F_4$, $OC_3F_6$, and $OC_4F_8$, or a combination of two or three groups independently selected from these groups, and is more preferably a group selected from $OC_3F_6$ and $OC_4F_8$. Examples of the combination of 2 or 3 groups independently selected from $OC_2F_4$, $OC_3F_6$, and $OC_4F_8$ include, but are not limited to, $-OC_2F_4OC_3F_6-$, $-OC_2F_4OC_4F_8-$, $-OC_3F_6OC_2F_4-$, $-OC_3F_6OC_3F_6-$, $-OC_3F_6OC_4F_8-$, $-OC_4F_8OC_4F_8-$, $-OC_4F_8OC_3F_6-$, $-OC_4F_8OC_2F_4-$, $-OC_2F_4OC_2F_4OC_3F_6-$, $-OC_2F_4OC_2F_4OC_4F_8-$, $-OC_2F_4OC_3F_6OC_2F_4-$, $-OC_2F_4OC_3F_6OC_3F_6-$, $-OC_2F_4OC_4F_8OC_2F_4-$, $-OC_3F_6OC_2F_4OC_2F_4-$, $-OC_3F_6OC_2F_4OC_3F_6-$, $-OC_3F_6OC_3F_6OC_2F_4-$ and $-OC_4F_8OC_2F_4OC_2F_4-$. In formula (f3), g is preferably an integer of 3 or more, and more preferably 5 or more. g is preferably an integer of 50 or less. In formula (f3), $OC_2F_4$, $OC_3F_6$, $OC_4F_8$, $OC_5F_{10}$, and $OC_6F_{12}$ may be either straight or branched, and are preferably straight. In this embodiment, formula (f3) is preferably $-(OC_2F_4-OC_3F_6)_g-$ or $-(OC_2F_4-OC_4F_8)_g-$.

In formula (f4), e is preferably an integer of 1 or more and 100 or less, and more preferably 5 or more and 100 or less. The sum of a, b, c, d, e, and f is preferably 5 or more, and more preferably 10 or more, such as 10 or more and 100 or less.

In formula (f5), f is preferably an integer of 1 or more and 100 or less, and more preferably 5 or more and 100 or less. The sum of a, b, c, d, e, and f is preferably 5 or more, and more preferably 10 or more, such as 10 or more and 100 or less.

In one embodiment, $R^F$ is a group represented by formula (f1).

In one embodiment, $R^F$ is a group represented by formula (f2).

In one embodiment, $R^F$ is a group represented by formula (f3).

In one embodiment, $R^F$ is a group represented by formula (f4).

In one embodiment, $R^F$ is a group represented by formula (f5).

The ratio of e to f in $R^F$ (hereinafter, referred to as an "e/f ratio") is 0.1 to 10, preferably 0.2 to 5, more preferably 0.2 to 2, even more preferably 0.2 to 1.5, and further preferably 0.2 to 0.85. With an e/f ratio of 10 or less, the lubricity, friction durability, and chemical resistance (such as durability against artificial sweat) of a cured layer (such as a surface-treating layer) obtained from the compound are further increased. The smaller the e/f ratio is, the higher the lubricity and the friction durability of a cured layer (such as a surface-treating layer). On the other hand, with an e/f ratio of 0.1 or more, the stability of the compound can be further increased. The larger the e/f ratio is, the higher the stability of the compound is.

In one embodiment, the e/f ratio is preferably 0.2 to 0.95, and more preferably 0.2 to 0.9.

In one embodiment, from the viewpoint of heat resistance, the e/f ratio is preferably 1.0 or more, and more preferably 1.0 to 2.0.

In one embodiment, the e/f ratio is 0.2 to 1.5, and preferably 0.5 to 1.1.

In one embodiment, the e/f ratio is 0.6 to 1.5.

In the fluoropolyether group-containing compound, the number average molecular weights of $R^{F1}$ and $R^{F2}$ moieties are not limited and are, for example, 500 to 30,000, preferably 1,500 to 30,000, more preferably 2,000 to 20,000, and even more preferably 2,000 to 10,000. Herein, the number average molecular weights of $R^{F1}$ and $R^{F2}$ are values measured by $^{19}$F-NMR.

In another embodiment, the number average molecular weights of $R^{F1}$ and $R^{F2}$ moieties may be 500 to 30,000, preferably 1,000 to 20,000, more preferably 2,000 to 15,000, and even more preferably 2,000 to 10,000, such as 3,000 to 6,500.

In another embodiment, the number average molecular weights of $R^{F1}$ and $R^{F2}$ moieties may be 4,000 to 30,000, preferably 5,000 to 10,000, and more preferably 6,000 to 10,000.

Herein, the group represented by $R^{F1}$ or $R^{F2}$ and the group represented by $R^{Si}$ are bonded via -$R^{X1}$-O-$R^{X2}$-C(=O)—N. Here, in the compounds represented by formulae (1) and (2), the group represented by $R^{F1}$ or $R^{F2}$ is a group containing a fluoropolyether group that mainly provides water-repellency, surface slickness, and the like, and the group represented by $R^{Si}$ is a silane moiety that provides the ability to bind to a substrate.

Having such a structure, the fluoropolyether group-containing compound of the present disclosure can contribute to the formation of a cured layer (for example, a surface-treating layer) having good friction durability (for example, skin friction durability, fabric friction durability, eraser friction durability, and steel wool friction durability), chemical resistance (for example, durability against a solvent, durability against artificial sweat, and durability against acid and alkali), water-repellency, oil-repellency, antifouling properties (for example, preventing grimes such as fingerprints from adhering), waterproof properties (preventing water from entering electronic components and the like), waterproof properties (preventing water from soaking electronic components and the like), surface slickness (or lubricity, e.g., removability of grimes such as fingerprints by wiping, and excellent tactile sensation), and the like. In particular, when the fluoropolyether group-containing compound of the present disclosure is used, the physical properties (for example, friction durability, chemical resistance, water-repellency, oil-repellency, antifouling properties, and lubricity) of a cured layer (for example, a surface-treating layer) formed can be improved. This is considered to be because the group represented by $R^{X1}$—O—$R^{X2}$—C(=O)—N is highly flexible, and thus the reaction between the terminal moiety of the group represented by $R^{Si}$ and a substrate can proceed particularly favorably.

$R^{X1}$ is each independently at each occurrence a $C_{1-6}$ alkylene group, and preferably a $C_{1-3}$ alkylene group, such as a methylene group.

$R^{X2}$ is each independently at each occurrence a $C_{1-6}$ alkylene group (preferably a $C_{1-3}$ alkylene group, such as a methylene group) optionally substituted with a $C_{1-6}$ alkyl group or cyclic alkyl group optionally containing one or more nitrogen atoms, oxygen atoms, sulfur atoms, or silicon atoms, or with a perfluoroalkyl group. Here, when a nitrogen atom, an oxygen atom, a sulfur atom, or a silicon atom is contained in the $C_{1-6}$ alkyl group or the cyclic alkyl group, such an atom is contained in the molecular chain (i.e., between a carbon atom and a carbon atom) of the $C_{1-6}$ alkyl group or the cyclic alkyl group.

$R^{X2}$ is each independently at each occurrence preferably a $C_{1-6}$ alkyl group, and more preferably a $C_{1-3}$ alkylene group, such as a methylene group.

In one embodiment, $R^{X1}$ is a $C_{1-6}$ alkylene group, and $R^{X2}$ is a $C_{1-6}$ alkylene group, preferably $R^{X1}$ is a $C_{1-3}$ alkylene group, and $R^{X2}$ is a $C_{1-3}$ alkylene group, and, for example, $R^{X1}$ and $R^{X2}$ are both methylene groups.

$R^{Si}$ is each independently at each occurrence represented by formula (S1) below.

$$-X^1-SiR^{a1}_{p1}R^{b1}_{q1}R^{c1}_{r1} \quad (S1)$$

In formula (S1), $X^1$ is each independently at each occurrence a single bond, an oxygen atom, or a divalent organic group.

Examples of $X^1$ that is a divalent organic group include, but are not limited to, groups represented by:

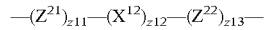

$$-(Z^{21})_{z11}-(X^{12})_{z12}-(Z^{22})_{z13}-$$

wherein $Z^{21}$ and $Z^{22}$ are a divalent organic group;
$X^{12}$ is an oxygen atom;
z11 is 0 or 1; z12 is 0 or 1; z13 is 0 or 1; and
at least one of z11 and z13 is 1.

In one embodiment, $X^1$ is a single bond.

In one embodiment, $X^1$ is an oxygen atom.

In one embodiment, $X^1$ is a divalent organic group.

$X^1$ is preferably a $C_{1-6}$ alkylene group, —$(CH_2)_{z5}$—O—$(CH_2)_{z6}$— (wherein z5 is an integer of 0 to 6, such as an integer of 1 to 6; z6 is an integer of 0 to 6, such as an integer of 1 to 6; and the sum of z5 and z6 is 1 or more), or —$(CH_2)_{z7}$-phenylene-$(CH_2)_{z8}$— (wherein z7 is an integer of 0 to 6, such as an integer of 1 to 6; z8 is an integer of 0 to 6, such as an integer of 1 to 6; and preferably the sum of z7 and z8 is 1 or more). The $C_{1-6}$ alkylene group may be straight or branched, and is preferably straight. These groups may be substituted with one or more substituents selected from, for example, a fluorine atom, a $C_{1-6}$ alkyl group, a $C_{2-6}$ alkenyl group, and a $C_{2-6}$ alkynyl group, and are preferably unsubstituted.

In a preferable embodiment, $X^1$ is a $C_{1-6}$ alkylene group or —$(CH_2)_{z7}$-phenylene-$(CH_2)_{z8}$—, preferably a $C_{1-6}$ alkylene group, and more preferably a $C_{1-3}$ alkylene group. Such a structure is advantageous in terms of increasing the friction durability and the chemical resistance of a cured layer (for example, a surface-treating layer) formed.

In one embodiment, $X^1$ may be —$CH_2CH_2CH_2$—.

$R^{a1}$ is each independently at each occurrence —$Z^{1'}$—$SiR^{a1'}_{p1'}R^{b1'}_{q1'}R^{c1'}_{r1'}$.

$Z^{1'}$ is each independently at each occurrence a single bond, an oxygen atom, or a divalent organic group.

In one embodiment, $Z^{1'}$ is a single bond.

In one embodiment, $Z^{1'}$ is an oxygen atom.

$Z^{1'}$ is preferably a divalent organic group.

In a preferable embodiment, $Z^{1'}$ does not form a siloxane bond with a Si atom to which $Z^{1'}$ is bonded. That is to say, in formula (S1), (Si—$Z^{1'}$—Si) does not contain a siloxane bond.

Examples of $Z^{1'}$ that is a divalent organic group include, but are not limited to, groups represented by:

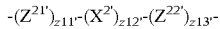

-$(Z^{21'})_{z11'}$-$(X^{2'})_{z12'}$-$(Z^{22'})_{z13'}$- wherein $Z^{21'}$ and $Z^{22'}$ are a divalent organic group;
$X^{2'}$ is an oxygen atom;
z11' is 0 or 1; z12' is 0 or 1; z13' is 0 or 1, and at least one of z11' and z13' is 1.

$Z^{1'}$ is preferably a $C_{1-6}$ alkylene group, —$(CH_2)_{z5'}$—O—$(CH_2)_{z6'}$— (wherein z5' is an integer of 0 to 6, such as an integer of 1 to 6; z6' is an integer of 0 to 6, such as an integer of 1 to 6; and the sum of z5' and z6' is 1 or more), or —$(CH_2)_{z7'}$-phenylene-$(CH_2)_{z8'}$— (wherein z7' is an integer of 0 to 6, such as an integer of 1 to 6; z8' is an integer of 0 to 6, such as an integer of 1 to 6; and preferably the sum of z7' and z8' is 1 or more). The $C_{1-6}$ alkylene group may be straight or branched, and is preferably straight. These groups may be substituted with one or more substituents selected from, for example, a fluorine atom, a $C_{1-6}$ alkyl group, a $C_{2-6}$ alkenyl group, and a $C_{2-6}$ alkynyl group, and are preferably unsubstituted.

In a preferable embodiment, $Z^{1'}$ is a $C_{1-6}$ alkylene group or —$(CH_2)_{z7'}$-phenylene-$(CH_2)_{z8'}$—, and preferably -phenylene-$(CH_2)_{z8'}$—. When $Z^{1'}$ is such a group, the light resistance or in particular the ultraviolet resistance of a cured film formed may be more increased. Preferably, z7' is an integer of 0 to 6, and z8' is an integer of 1 to 6.

In another preferable embodiment, $Z^{1'}$ is a $C_{1-6}$ alkylene group, and more preferably a $C_{1-3}$ alkylene group. Due to such a structure, the light resistance or in particular the ultraviolet resistance of a cured film formed may be more increased.

In one embodiment, $Z^{1'}$ may be —$CH_2CH_2CH_2$—. In another embodiment, $Z^{1'}$ may be —$CH_2CH_2$—.

$R^{a1'}$ is each independently at each occurrence —$Z^{1''}$—$SiR^{a1''}_{p1''}R^{b1''}_{q1''}R^{c1''}_{r1''}$.

$Z^{1''}$ is each independently at each occurrence a single bond, an oxygen atom, or a divalent organic group.

In one embodiment, $Z^{1''}$ is a single bond.
In one embodiment, $Z^{1''}$ is an oxygen atom.
$Z^{1''}$ is preferably a divalent organic group.

In a preferable embodiment, $Z^{1''}$ does not form a siloxane bond with a Si atom to which $Z^{1''}$ is bonded. That is to say, in formula (Si), (Si—$Z^{1''}$—Si) does not contain a siloxane bond.

Examples of $Z^{1''}$ that is a divalent organic group include, but are not limited to, groups represented by:

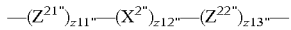

—$(Z^{21''})_{z11''}$—$(X^{2''})_{z12''}$—$(Z^{22''})_{z13''}$— wherein $Z^{21''}$ and $Z^{22''}$ are a divalent organic group;
$X^{2''}$ is an oxygen atom;
z11" is 0 or 1; z12" is 0 or 1; z13" is 0 or 1, and at least one of z11" and z13" is 1.

$Z^{1''}$ is preferably a $C_{1-6}$ alkylene group, —$(CH_2)_{z5''}$—O—$(CH_2)_{z6''}$— (wherein z5" is an integer of 0 to 6, such as an integer of 1 to 6; z6" is an integer of 0 to 6, such as an integer of 1 to 6; and the sum of z5" and z6" is 1 or more), or —$(CH_2)_{z7''}$-phenylene-$(CH_2)_{z8''}$— (wherein z7" is an integer of 0 to 6, such as an integer of 1 to 6; z8" is an integer of 0 to 6, such as an integer of 1 to 6; and preferably the sum of z7" and z8" is 1 or more). The $C_{1-6}$ alkylene group may be straight or branched, and is preferably straight. These groups may be substituted with one or more substituents selected from, for example, a fluorine atom, a $C_{1-6}$ alkyl group, a $C_{2-6}$ alkenyl group, and a $C_{2-6}$ alkynyl group, and are preferably unsubstituted.

In a preferable embodiment, $Z^{1''}$ is a $C_{1-6}$ alkylene group or —$(CH_2)_{z7''}$-phenylene-$(CH_2)_{z8''}$—, and preferably -phenylene-$(CH_2)_{z8''}$—. When $Z^{1''}$ is such a group, the light resistance or in particular the ultraviolet resistance of a cured film formed may be more increased. Preferably, z7" is an integer of 0 to 6, and z8" is an integer of 1 to 6.

In another preferable embodiment, $Z^{1''}$ is a $C_{1-6}$ alkylene group, and more preferably a $C_{1-3}$ alkylene group. Due to such a structure, the light resistance or in particular the ultraviolet resistance of a cured film formed may be more increased.

In one embodiment, $Z^{1''}$ may be —$CH_2CH_2CH_2$—. In another embodiment, $Z^{1''}$ may be —$CH_2CH_2$—.

$R^{a1''}$ is each independently at each occurrence —$Z^{1'''}$—$SiR^{b1'''}_{q1'''}R^{c1'''}_{r1'''}$.

$Z^{1'''}$ is each independently at each occurrence a single bond, an oxygen atom, or a divalent organic group.

In one embodiment, $Z^{1'''}$ is a single bond.
In one embodiment, $Z^{1'''}$ is an oxygen atom.
$Z^{1'''}$ is preferably a divalent organic group.

In a preferable embodiment, $Z^{1'''}$ does not form a siloxane bond with a Si atom to which $Z^{1'''}$ is bonded. That is to say, in formula (S1), (Si—$Z^{1'''}$—Si) does not contain a siloxane bond.

Examples of $Z^{1'''}$ that is a divalent organic group include, but are not limited to, groups represented by:

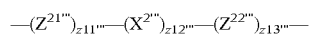

—$(Z^{21'''})_{z11'''}$—$(X^{2'''})_{z12'''}$—$(Z^{22'''})_{z13'''}$— wherein $Z^{21'''}$ and $Z^{22'''}$ are each a divalent organic group;
$X^{2'''}$ is an oxygen atom;
z11''' is 0 or 1; z12''' is 0 or 1; z13''' is 0 or 1, and at least one of z11''' and z13''' is 1.

$Z^{1'''}$ is preferably a $C_{1-6}$ alkylene group, —$(CH_2)_{z5'''}$—O—$(CH_2)_{z6'''}$— (wherein z5''' is an integer of 0 to 6, such as an integer of 1 to 6; z6''' is an integer of 0 to 6, such as an integer of 1 to 6; and the sum of z5''' and z6''' is 1 or more), or —$(CH_2)_{z7'''}$-phenylene-$(CH_2)_{z8'''}$— (wherein z7''' is an integer of 0 to 6, such as an integer of 1 to 6; z8''' is an integer of 0 to 6, such as an integer of 1 to 6; and preferably the sum of z7''' and z8''' is 1 or more). The $C_{1-6}$ alkylene group may be straight or branched, and is preferably straight. These groups may be substituted with one or more substituents selected from, for example, a fluorine atom, a $C_{1-6}$ alkyl group, a $C_{2-6}$ alkenyl group, and a $C_{2-6}$ alkynyl group, and are preferably unsubstituted.

In a preferable embodiment, $Z^{1'''}$ is a $C_{1-6}$ alkylene group or —$(CH_2)_{z7'''}$-phenylene-$(CH_2)_{z8'''}$—, and preferably -phenylene-$(CH_2)_{z8'''}$—. When $Z^{1'''}$ is such a group, the light resistance or in particular the ultraviolet resistance of a cured film formed may be more increased. Preferably, z7''' is an integer of 0 to 6, and z8''' is an integer of 1 to 6.

In another preferable embodiment, $Z^{1'''}$ is a $C_{1-6}$ alkylene group, and more preferably a $C_{1-3}$ alkylene group. Due to such a structure, the light resistance or in particular the ultraviolet resistance of a cured film formed may be more increased.

In one embodiment, $Z^{1'''}$ may be —$CH_2CH_2CH_2$—. In another embodiment, $Z^{1'''}$ may be —$CH_2CH_2$—.

$R^{b1'''}$ is each independently at each occurrence a hydroxyl group or a hydrolyzable group. $R^{b1'''}$ is preferably each independently at each occurrence a hydrolyzable group.

$R^{b1'''}$ is preferably each independently at each occurrence —$OR^h$, —$OCOR^h$, —O—N=$CR^h_2$, —$NR^h_2$, —$NHR^h$, or halogen (in these formulae, $R^h$ represents a substituted or unsubstituted $C_{1-4}$ alkyl group), and more preferably —$OR^h$ (i.e., an alkoxy group). Examples of $R^h$ include unsubstituted alkyl groups such as a methyl group, an ethyl group, a propyl group, an isopropyl group, a n-butyl group, and an isobutyl group; and substituted alkyl groups such as a chloromethyl group. Among such groups, an alkyl group or in particular an unsubstituted alkyl group is preferable, and a methyl group or an ethyl group is more preferable. In one embodiment, $R^h$ is a methyl group, and in another embodiment, $R^h$ is an ethyl group.

$R^{c1'''}$ is each independently at each occurrence a hydrogen atom or a monovalent organic group. Such a monovalent organic group does not include the above hydrolyzable group.

In $R^{c1'''}$, the monovalent organic group is preferably a $C_{1-20}$ alkyl group, more preferably a $C_{1-6}$ alkyl group, and even more preferably a methyl group.

$q1'''$ is each independently at each occurrence an integer of 0 to 3, and $r1'''$ is each independently at each occurrence 0 to 3. The sum of $q1'''$ and $r1'''$ is 3 in the $(SiR^{b1'''}_{q1'''}R^{c1'''}_{r1'''})$ unit.

Preferably $q1'''$ is an integer of 1 to 3, $r1'''$ is an integer of 0 to 2, more preferably $q1'''$ is 2 or 3, and $r1'''$ is 0 or 1, and particularly preferably $q1'''$ is 3.

$R^{b1''}$ is each independently at each occurrence a hydroxyl group or a hydrolyzable group. $R^{b1''}$ is preferably each independently at each occurrence a hydrolyzable group.

$R^{b1''}$ is preferably each independently at each occurrence —$OR^h$, —$OCOR^h$, —O—N=$CR^h_2$, —$NR^h_2$, —$NHR^h$, or halogen (in these formulae, $R^h$ represents a substituted or unsubstituted $C_{1-4}$ alkyl group), and more preferably —$OR^h$ (i.e., an alkoxy group). Examples of $R^h$ include unsubstituted alkyl groups such as a methyl group, an ethyl group, a propyl group, an isopropyl group, a n-butyl group, and an isobutyl group; and substituted alkyl groups such as a chloromethyl group. Among such groups, an alkyl group or in particular an unsubstituted alkyl group is preferable, and a methyl group or an ethyl group is more preferable. In one embodiment, $R^h$ is a methyl group, and in another embodiment, $R^h$ is an ethyl group.

$R^{c1''}$ is each independently at each occurrence a hydrogen atom or a monovalent organic group. Such a monovalent organic group does not include the above hydrolyzable group.

In $R^{c1''}$, the monovalent organic group is preferably a $C_{1-20}$ alkyl group, more preferably a $C_{1-6}$ alkyl group, and even more preferably a methyl group.

$p1''$ is each independently at each occurrence an integer of 0 to 3, $q1''$ is each independently at each occurrence an integer of 0 to 3, and $r1''$ is each independently at each occurrence an integer of 0 to 3. The sum of $p1''$, $q1''$, and $r1''$ is 3 in the $(SiR^{a1''}_{p1''}R^{b1''}_{q1''}R^{c1''}_{r1''})$ unit.

In one embodiment, $p1''$ is 0.

In one embodiment, $p1''$ may be each independently an integer of 1 to 3, an integer of 2 to 3, or 3 for each $(SiR^{a1''}_{p1''}R^{b1''}_{q1''}R^{c1''}_{r1''})$ unit. In a preferable embodiment, $p1''$ is 3.

In one embodiment, $q1''$ is each independently an integer of 1 to 3, preferably an integer of 2 to 3, and more preferably 3 for each $(SiR^{a1''}_{p1''}R^{b1''}_{q1''}R^{c1''}_{r1''})$ unit.

In one embodiment, $p1''$ is 0, and $q1''$ is each independently an integer of 1 to 3, preferably an integer of 2 to 3, and more preferably 3 for each $(SiR^{a1''}_{p1''}R^{b1''}_{q1''}R^{c1''}_{r1''})$ unit.

$R^{b1'}$ is each independently at each occurrence a hydroxyl group or a hydrolyzable group. $Rb^{1'}$ is preferably each independently at each occurrence a hydrolyzable group.

$R^{b1'}$ is preferably each independently at each occurrence —$OR^h$, —$OCOR^h$, —O—N=$CR^h_2$, —$NR^h_2$, —$NHR^h$, or halogen (in these formulae, $R^h$ represents a substituted or unsubstituted $C_{1-4}$ alkyl group), and more preferably —$OR^h$ (i.e., an alkoxy group). Examples of $R^h$ include unsubstituted alkyl groups such as a methyl group, an ethyl group, a propyl group, an isopropyl group, a n-butyl group, and an isobutyl group; and substituted alkyl groups such as a chloromethyl group. Among such groups, an alkyl group or in particular an unsubstituted alkyl group is preferable, and a methyl group or an ethyl group is more preferable. In one embodiment, $R^h$ is a methyl group, and in another embodiment, Rh is an ethyl group.

$R^{c1'}$ is each independently at each occurrence a hydrogen atom or a monovalent organic group. Such a monovalent organic group does not include the above hydrolyzable group.

In $R^{c1'}$, the monovalent organic group is preferably a $C_{1-20}$ alkyl group, more preferably a $C_{1-6}$ alkyl group, and even more preferably a methyl group.

$p1'$ is each independently at each occurrence an integer of 0 to 3, $q1'$ is each independently at each occurrence an integer of 0 to 3, and $r1'$ is each independently at each occurrence an integer of 0 to 3. The sum of $p1'$, $q1'$, and $r1'$ is 3 in the $(SiR^{a1'}_{p1'}R^{b1'}_{q1'}R^{c1'}_{r1'})$ unit.

In one embodiment, $p1'$ is 0.

In one embodiment, $p1'$ may be each independently an integer of 1 to 3, an integer of 2 to 3, or 3 for each $(SiR^{a1'}_{p1'}R^{b1'}_{q1'}R^{c1'}_{r1'})$ unit. In a preferable embodiment, $p1'$ is 3.

In one embodiment, $q1'$ is each independently an integer of 1 to 3, preferably an integer of 2 to 3, and more preferably 3 for each $(SiR^{a1'}_{p1'}R^{b1'}_{q1'}R^{c1'}_{r1'})$ unit.

In one embodiment, $p1'$ is 0, and $q1'$ is each independently an integer of 1 to 3, preferably an integer of 2 to 3, and more preferably 3 for each $(SiR^{a1'}_{p1'}R^{b1'}_{q1'}R^{c1'}_{r1'})$ unit.

$R^{b1}$ is each independently at each occurrence a hydroxyl group or a hydrolyzable group. $R^{b1}$ is preferably each independently at each occurrence a hydrolyzable group.

$R^{c1}$ is each independently at each occurrence a hydrogen atom or a monovalent organic group. Such a monovalent organic group does not include the above hydrolyzable group.

In $R^{c1}$, the monovalent organic group is preferably a $C_{1-20}$ alkyl group, more preferably a $C_{1-6}$ alkyl group, and even more preferably a methyl group.

$p1$ is each independently at each occurrence an integer of 0 to 3, $q1$ is each independently at each occurrence an integer of 0 to 3, and $r1$ is each independently at each occurrence an integer of 0 to 3. The sum of p1, q1, and r1 is 3 in the $(SiR^{a1}{}_{p1}R^{b1}{}_{q1}R^{c1}{}_{r1})$ unit.

In one embodiment, p1 is 0.

In one embodiment, p1 may be each independently an integer of 1 to 3, an integer of 2 to 3, or 3 for each $(SiR^{a1}{}_{p1}R^{b1}{}_{q1}R^{c1}{}_{r1})$ unit. In a preferable embodiment, p1 is 3.

In one embodiment, q1 is each independently an integer of 1 to 3, preferably an integer of 2 to 3, and more preferably 3 for each $(SiR^{a1}{}_{p1}R^{b1}{}_{q1}R^{c1}{}_{r1})$ unit.

In one embodiment, p1 is 0, and q1 is each independently an integer of 1 to 3, preferably an integer of 2 to 3, and more preferably 3 for each $(SiR^{a1}{}_{p1}R^{b1}{}_{q1}R^{c1}{}_{r1})$ unit.

At least one $R^{b1}$, or $R^{b1'}$, or $R^{b1'''}$ is present for each group represented by $R^{Si}$. That is to say, in formula (1) or (2), each group represented by $R^{Si}$ bonded to the N atom has at least one Si atom to which a hydroxyl group or a hydrolyzable group binds.

In other words, the group represented by $R^{Si}$ has at least one of:

a group represented by $-X^1-SiR^{a1}{}_{p1}R^{b1}{}_{q1}R^{c1}{}_{r1}$ (wherein q1 is an integer of 1 to 3, preferably q1 is 2 or 3, and more preferably q1 is 3, and the sum of p1, q1, and r1 is 3); a group represented by $-Z^{1'}-SiR^{a1'}{}_{p1'}R^{b1'}{}_{q1'}R^{c1'}{}_{r1'}$ (wherein q1' is an integer of 1 to 3, preferably q1' is 2 or 3, and more preferably q1' is 3, and the sum of p1', q1', and r1' is 3); or a group represented by $-Z^{1''}-SiR^{a1''}{}_{p1''}R^{b1''}{}_{q1''}R^{c1''}{}_{r1''}$ (wherein q1'' is an integer of 1 to 3, preferably q1'' is 2 or 3, and more preferably q1'' is 3, and the sum of p1'', q1'', and r1'' is 3); and a group represented by $-Z^{1'''}-SiR^{b1'''}{}_{q1'''}R^{c1'''}{}_{r1'''}$ (wherein q1''' is an integer of 1 to 3, preferably q1''' is 2 or 3, and more preferably q1''' is 3, and the sum of q1''' and r1''' is 3).

The Si atom to which a hydroxyl group or a hydrolyzable group binds preferably is present at the terminal moiety of the group represented by $R^{Si}$. In other words, preferably, the Si atom to which a hydroxyl group or a hydrolyzable group binds is present at the terminal moieties of formulae (1) and (2).

The group represented by $R^{Si}$ preferably has at least one of:

a group represented by $-X^1-SiR^{b1}{}_{q1}R^{c1}{}_{r1}$ (wherein q1 is an integer of 1 to 3, preferably q1 is 2 or 3, and more preferably q1 is 3, and the sum of q1 and r1 is 3); a group represented by $-Z^{1'}-SiR^{b1'}{}_{q1'}R^{c1'}{}_{r1'}$ (wherein q1' is an integer of 1 to 3, preferably q1' is 2 or 3, and more preferably q1' is 3, and provided that the sum of q1' and r1' is 3);

a group represented by $-Z^{1''}-SiR^{b1''}{}_{q1''}R^{c1''}{}_{r1''}$ (wherein q1'' is an integer of 1 to 3, preferably q1'' is 2 or 3, and more preferably q1'' is 3, provided that the sum of q1'' and r1'' is 3); and a group represented by $-Z^{1'''}-SiR^{b'''}{}_{q1'''}R^{c1'''}{}_{r1'''}$ (wherein q1''' is an integer of 1 to 3, preferably q1''' is 2 or 3, and more preferably q1''' is 3, and the sum of q1''' and r1''' is 3).

$R^{Si}$ is preferably $-X^1-SiR^{b1}{}_2R^{cq}$ or $-X^1-SiR^{b1}{}_3$, and more preferably $-X^1-SiR^{b1}{}_3$.

In one embodiment, when p1 is an integer of 1 to 3 in $R^{Si}$, is preferably $-Z^{1'}-SiR^{b1'}{}_2R^{c1'}$ or $-Z^{1'}-SiR^{b1'}{}_3$, and more preferably $-Z^{1'}-SiR^{b1'}{}_3$. In this embodiment, p1 is preferably 2 or 3, and more preferably 3.

In one embodiment, when p1' is an integer of 1 to 3 in $R^{Si}$, $R^{a1'}$ is preferably $-Z^{1'}-SiR^{b1'}{}_2R^{c1'}$ or $-Z^{1'}-SiR^{b1'}{}_3$, and more preferably $-Z^{1'''}-SiR^{b1'''}{}_3$. In this embodiment, p1' is preferably 2 or 3, and more preferably 3.

In one embodiment, when p1'' is an integer of 1 to 3 in $R^{Si}$, $R^{a1''}$ is preferably $-Z^{1'''}-SiR^{b1'''}{}_2R^{c1'''}$ or $-Z^{1'''}-SiR^{b1'''}{}_3$, and more preferably $-Z^{1'''}-SiR^{b1'''}{}_3$. In this embodiment, p1'' is preferably 2 or 3, and more preferably 3.

In one embodiment, the fluoropolyether group-containing compound of the present disclosure is a compound represented by formula (1).

In one embodiment, the fluoropolyether group-containing compound of the present disclosure is a compound represented by formula (2).

In one embodiment, the fluoropolyether group-containing compound of the present disclosure is represented by formula (1) or (2) below:

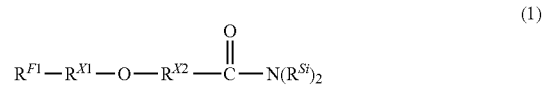

(1)

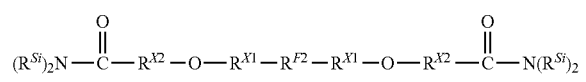

(2)

wherein
$R^{F1}$ is $R^{f1}$-$R^F$-$O_q$—;
$R^{F2}$ is -$R^{f2}{}_p$-$R^F$-$O_q$—;
$R^{f1}$ is a $C_{1-16}$ alkyl group optionally substituted with one or more fluorine atoms;
$R^{f2}$ is a $C_{1-6}$ alkylene group optionally substituted with one or more fluorine atoms;
$R^F$ is each independently at each occurrence a group represented by formula (f1), (f2), (f3), (f4), or (f5) below:

(f1)

in formula (f1), d is an integer of 1 to 200;

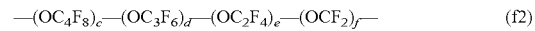

(f2)

in formula (f2), c and d are each independently an integer of 0 or more and 30 or less, e and f are each independently an integer of 1 or more and 200 or less,
the sum of c, d, e, and f is 2 or more, and
the occurrence order of each repeating unit enclosed in parentheses provided with a subscript c, d, e, or f is not limited in the formula;

(f3)

in formula (f3), $R^6$ is $OCF_2$ or $OC_2F_4$,
$R^7$ is a group selected from $OC_2F_4$, $OC_3F_6$, $OC_4F_8$, $OC_5F_{10}$, and $OC_6F_{12}$, or is a combination of two or three groups independently selected from these groups, and
g is an integer of 2 to 100;

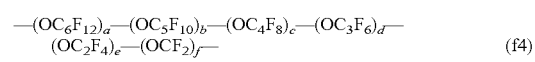

(f4)

in formula (f4), e is an integer of 1 or more and 200 or less, a, b, c, d, and f are each independently an integer of 0 or more and 200 or less, the sum of a, b, c, d, e, and f is at least 1, and the occurrence order of each repeating unit enclosed in parentheses provided with a, b, c, d, e, or f is not limited in the formula; and

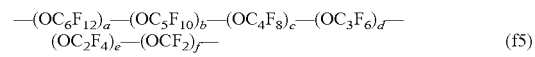

(f5)

in formula (f5), f is an integer of 1 or more and 200 or less, a, b, c, d, and e are each independently an integer of 0 or more and 200 or less, the sum of a, b, c, d, e, and f is at least 1, and the occurrence order of each repeating unit enclosed in parentheses provided with a, b, c, d, e, or f is not limited in the formula;

p is 0 or 1;

q is 0 or 1;

$R^{X1}$ is each independently at each occurrence a $C_{1-6}$ alkylene group, and preferably a $C_{1-3}$ alkylene group, such as a methylene group;

$R^{X2}$ is each independently at each occurrence a $C_{1-6}$ alkylene group, and preferably a $C_{1-3}$ alkylene group, such as a methylene group;

$R^{Si}$ is each independently at each occurrence represented by formula (S1) below:

(S1)

$X^1$ is each independently at each occurrence a $C_{1-6}$ alkylene group or $-(CH_2)_{z7}$-phenylene-$(CH_2)_{z8}-$, preferably a $C_{1-6}$ alkylene group, and more preferably a $C_{1-3}$ alkylene group;

z7 is an integer of 0 to 6, and z8 is an integer of 1 to 6;

$R^{b1}$ is each independently at each occurrence a hydroxyl group or a hydrolyzable group; and p1 and r1 are 0, and q1 is 3.

The compound represented by formula (1) or formula (2) can be produced by combining known methods.

As one embodiment, a method suitable for producing the fluoropolyether group-containing compound of the present disclosure represented by formula (1) will now be described below.

The fluoropolyether group-containing compound of the present disclosure can be produced by, for example, a method comprising reacting a compound represented by formula (1c) with $HSiM_3$ (wherein M is each independently a halogen atom (i.e., I, Br, Cl, or F) or a $C_{1-6}$ alkoxy group, preferably a halogen atom, and more preferably Cl) and, as desired, a compound represented by $R^{b1}L'$ ($R^{b1}$ has the same definition as above, and L' represents a group capable of binding to $R^{b1}$) and/or a compound represented by $R^{c1}L''$ (Rdl has the same definition as above, and L'' represents a group capable of binding to $R^{c1}$).

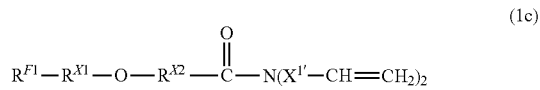
(1c)

In formulae (1c), $R^{F1}$, $R^{X1}$, and $R^{X2}$ have the same definitions as those of $R^{F1}$, $R^{X1}$, and $R^{X2}$ in formula (1), respectively. $X^{1'}$ represents a structure having two fewer carbon atoms than $X^1$ of formula (1). $-X^{1'}-CH_2CH_2-$ derived from the structure represented by $-X^{1'}-CH=CH_2$ corresponds to $X^1$ in formula (1).

The above step is preferably carried out in a suitable solvent in the presence of a suitable catalyst.

Examples of the suitable catalyst include, but are not limited to, Pt, Pd, and Rh. Such a catalyst may be in any form, e.g., in the form of a complex.

The suitable solvent is not limited as long as it does not adversely affect the reaction, and examples include 1,3-bis(trifluoromethyl)benzene, perfluorobutyl ethyl ether, perfluorohexyl methyl ether, perfluorohexane, and hexafluorobenzene.

The reaction temperature in the reaction is not limited, and is usually 0 to 100° C. and preferably 50 to 80° C.; the reaction time is not limited, and is usually 60 to 600 minutes and preferably 120 to 300 minutes; and the reaction pressure is not limited, and is −0.2 to 1 MPa (gauge pressure) and conveniently is atmospheric pressure.

The compound represented by formula (1c) can be produced by, but is not limited to, for example, introducing a group having a double bond into the terminal moiety of the compound represented by formula (1b). Specifically, the compound can be obtained by reacting a compound represented by formula (1b) below with an amine compound having a double bond at the terminal moiety (such as allylamine or diallylamine). $R^X$ is a hydrogen atom, a hydroxyl group, an alkoxyl group having 1 to 10 carbon atoms, a phenol group, a sulfonyl group, halogen, or the like, and is specifically halogen.

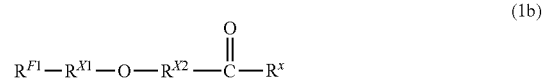
(1b)

The above step is preferably carried out in a suitable solvent in the presence of a suitable base.

The suitable base is not particularly limited, and examples include lithium hydroxide, sodium hydroxide, potassium hydroxide, sodium carbonate, potassium carbonate, sodium hydrogencarbonate, potassium hydrogencarbonate, and tertiary amines (triethylamine, pyridine, diisopropylethylamine, and 2,6-lutidine). Such a base may be in any form.

The suitable solvent is not limited as long as it does not adversely affect the reaction, and examples include 1,3-bis(trifluoromethyl)benzene, perfluorobutyl ethyl ether, perfluorohexyl methyl ether, perfluorohexane, and hexafluorobenzene.

The reaction temperature in the reaction is not limited, and is usually 0 to 100° C. and preferably 40 to 80° C.; the reaction time is not limited, and is usually 60 to 600 minutes and preferably 120 to 240 minutes; and the reaction pressure is not limited, and is −0.2 to 1 MPa (gauge pressure) and conveniently is atmospheric pressure.

The compound represented by formula (1b) can be obtained by, but is not limited to, for example, introducing Hal-$R^{X2}$—C(=O)—$R^X$ into the OH group at the terminal of a compound represented by formula (1a). Here, Hal is a halogen atom, such as a Br atom.

(1a)

The above step is preferably carried out in a suitable solvent in the presence of a suitable base.

The suitable base is not particularly limited, and examples include lithium hydroxide, sodium hydroxide, potassium hydroxide, sodium carbonate, potassium carbonate, sodium hydrogencarbonate, potassium hydrogencarbonate, and tertiary amines (triethylamine, pyridine, diisopropylethylamine, and 2,6-lutidine). Such a base may be in any form.

The suitable solvent is not limited as long as it does not adversely affect the reaction, and examples include 1,3-bis(trifluoromethyl)benzene, perfluorobutyl ethyl ether, perfluorohexyl methyl ether, perfluorohexane, and hexafluorobenzene.

The reaction temperature in the reaction is not limited, and is usually 0 to 100° C. and preferably 50 to 100° C.; the reaction time is not limited, and is usually 60 to 600 minutes and preferably 80 to 240 minutes; and the reaction pressure is not limited, and is −0.2 to 1 MPa (gauge pressure) and conveniently is atmospheric pressure.

In another embodiment, the compound represented by formula (1c) can be synthesized by, but is not limited to, a method comprising reacting a compound represented by formula (1a) with a compound represented by Hal-R$^{X2}$—C(O)N(X$^{1'}$—CH═CH$_2$)$_2$. Here, Hal, R$^{X2}$, X$^{1'}$, R$^{F1}$, and R$^{X1}$ have the same meanings as described above.

$$R^{F1}\text{—}R^{X1}\text{—OH} \tag{1a}$$

The above step is preferably carried out in a suitable solvent in the presence of a suitable base.

The suitable base is not particularly limited, and examples include lithium hydroxide, sodium hydroxide, potassium hydroxide, sodium carbonate, potassium carbonate, sodium hydrogencarbonate, potassium hydrogencarbonate, and tertiary amines (triethylamine, pyridine, diisopropylethylamine, and 2,6-lutidine). Such a base may be in any form.

The suitable solvent is not limited as long as it does not adversely affect the reaction, and examples include 1,3-bis(trifluoromethyl)benzene, perfluorobutyl ethyl ether, perfluorohexyl methyl ether, perfluorohexane, and hexafluorobenzene.

The reaction temperature in the reaction is not limited, and is usually 0 to 100° C. and preferably 50 to 100° C.; the reaction time is not limited, and is usually 60 to 600 minutes and preferably 100 to 300 minutes; and the reaction pressure is not limited, and is −0.2 to 1 MPa (gauge pressure) and conveniently is atmospheric pressure.

The reaction conditions when producing the fluoropolyether group-containing silane compound of the present disclosure can be suitably regulated to a preferable range by those skilled in the art.

Below, the composition (for example, a surface-treating agent) of the present disclosure will now be described.

The composition (for example, a surface-treating agent) of the present disclosure contains at least one fluoropolyether group-containing compound represented by formula (1) or formula (2).

In one embodiment, the composition (for example, a surface-treating agent) of the present disclosure may contain the fluoropolyether group-containing compounds of formula (1) and formula (2).

In one embodiment, the lower limit of the ratio (molar ratio) of the fluoropolyether group-containing compound of formula (2) to the total of the fluoropolyether group-containing compounds of formulae (1) and (2) contained in the composition (for example, a surface-treating agent) of the present disclosure may be preferably 0.001, more preferably 0.002, even more preferably 0.005, yet more preferably 0.01, particularly preferably 0.02, and especially 0.05. The upper limit of the ratio (molar ratio) of the fluoropolyether group-containing compound of formula (2) to the total of the fluoropolyether group-containing compounds of formulae (1) and (2) may be preferably 0.35, more preferably 0.30, even more preferably 0.20, and yet more preferably 0.15 or 0.10. The ratio (molar ratio) of the fluoropolyether group-containing compound of formula (2) to the total of the fluoropolyether group-containing compounds of formulae (1) and (2) is preferably 0.001 or more and 0.30 or less, more preferably 0.001 or more and 0.20 or less, even more preferably 0.002 or more and 0.20 or less, yet more preferably 0.005 or more and 0.20 or less, and particularly preferably 0.01 or more and 0.20 or less, such as 0.02 or more and 0.15 or less, or 0.05 or more and 0.15 or less. By containing the fluoropolyether group-containing compound of formula (2) in the above range, the composition of the present disclosure can contribute to the formation of a cured layer having good friction durability.

The composition (for example, a surface-treating agent) of the present disclosure is capable of imparting water-repellency, oil-repellency, antifouling properties, waterproof properties, surface slickness, and friction durability to a substrate, and can be suitably used as, but is not limited to, an antifouling coating agent or a water-proof coating agent.

The composition (for example, a surface-treating agent) of the present disclosure may further contain a solvent, a (non-reactive) fluoropolyether compound that can be understood as a fluorine-containing oil or preferably a perfluoro(poly)ether compound (hereinafter, collectively referred to as a "fluorine-containing oil"), a (non-reactive) silicone compound that can be understood as a silicone oil (hereinafter, referred to as a "silicone oil"), a catalyst, a surfactant, a polymerization inhibitor, a sensitizer, and the like.

Examples of the solvent include aliphatic hydrocarbons such as hexane, cyclohexane, heptane, octane, nonane, decane, undecane, dodecane, and mineral spirits; aromatic hydrocarbons such as benzene, toluene, xylene, naphthalene, and solvent naphtha; esters such as methyl acetate, ethyl acetate, propyl acetate, n-butyl acetate, isopropyl acetate, isobutyl acetate, cellosolve acetate, propylene glycol methyl ether acetate, carbitol acetate, diethyl oxalate, ethyl pyruvate, ethyl 2-hydroxybutyrate, ethyl acetoacetate, amyl acetate, methyl lactate, ethyl lactate, methyl 3-methoxypropionate, ethyl 3-methoxypropionate, methyl 2-hydroxyisobutyrate, and ethyl 2-hydroxyisobutyrate; ketones such as acetone, methyl ethyl ketone, methyl isobutyl ketone, 2-hexanone, cyclohexanone, methyl amino ketone, and 2-heptanone; glycol ethers such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ether; alcohols such as methanol, ethanol, iso-propanol, n-butanol, isobutanol, tert-butanol, sec-butanol, 3-pentanol, octyl alcohol, 3-methyl-3-methoxybutanol, and tert-amyl alcohol; glycols such as ethylene glycol and propylene glycol; cyclic ethers such as tetrahydrofuran, tetrahydropyran, and dioxane; amides such as N,N-dimethylformamide and N,N-dimethylacetamide; ether alcohols such as methyl cellosolve, cellosolve, isopropyl cellosolve, butyl cellosolve, and diethylene glycol monomethyl ether; diethylene glycol monoethyl ether acetate; and fluorine-containing solvents such as 1,1,2-trichloro-1,2,2-trifluoroethane, 1,2-dichloro-1,1,2,2-tetrafluoroethane, dimethyl sulfoxide, 1,1-dichloro-1,2,2,3,3-pentafluoropropane (HCFC 225), Zeorora H, HFE 7100, HFE 7200, and HFE 7300. Alternatively, the solvent may be a mixed solvent of two or more of such solvents.

The fluorine-containing oil is not limited, and examples include compounds (perfluoro(poly)ether compounds) represented by general formula (3) below:

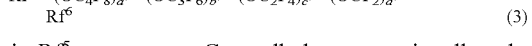
$$Rf^5\text{—}(OC_4F_8)_a\text{—}(OC_3F_6)_b\text{—}(OC_2F_4)_c\text{—}(OCF_2)_d\text{—}Rf^6 \tag{3}$$

wherein Rf$^5$ represents a C$_{1-16}$ alkyl group optionally substituted with one or more fluorine atoms (preferably a C$_{1-16}$ perfluoroalkyl group), Rf$^6$ represents a C$_{1-16}$ alkyl group optionally substituted with one or more fluorine atoms (preferably a C$_{1-16}$ perfluoroalkyl group), a fluorine atom, or a hydrogen atom, and Rf$^5$ and Rf$^6$ are more preferably each independently a C$_{1-3}$ perfluoroalkyl group.

a', b', c', and d' respectively represent the numbers of 4 repeating units of perfluoro(poly)ether constituting the main backbone of the polymer and are mutually independently an integer of 0 or more and 300 or less, and the sum of a', b', c', and d' is at least 1, preferably 1 to 300, and more preferably 20 to 300. The occurrence order of each repeating unit enclosed in parentheses provided with a subscript a', b', c', or d' is not limited in the formula. Among these repeating units, —(OC$_4$F$_8$)— may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$) 2CF$_2$)—, —(OCF$_2$C(CF$_3$)$_2$)—, —(OCF(CF$_3$)CF(CF$_3$))—, —(OCF(C$_2$F$_5$)CF$_2$)—, and (OCF$_2$CF(C$_2$F$_5$))—, and preferably —(OCF$_2$CF$_2$CF$_2$CF$_2$)—. —(OC$_3$F$_6$)— may be any of —(OCF$_2$CF$_2$CF$_2$)—, —(OCF(CF$_3$)CF$_2$)—, and (OCF$_2$CF(CF$_3$))—, and is preferably —(OCF$_2$CF$_2$CF$_2$)—. —(OC$_2$F$_4$)— may be any of —(OCF$_2$CF$_2$)— and (OCF(CF$_3$))—, and is preferably —(OCF$_2$CF$_2$)—.

Examples of the perfluoro(poly)ether compound represented by general formula (3) include compounds represented by any of general formulae (3a) and (3b) below (which may be used singly or as a mixture of two or more):

$$Rf^5—(OCF_2CF_2CF_2)_{b''}—Rf^6 \quad (3a)$$

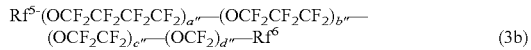

$$Rf^5\text{-}(OCF_2CF_2CF_2CF_2)_{a''}—(OCF_2CF_2CF_2)_{b''}—(OCF_2CF_2)_{c''}—(OCF_2)_{d''}—Rf^6 \quad (3b)$$

In these formulae, Rf$^5$ and Rf$^6$ are as described above; in formula (3a), b" is an integer of 1 or more and 100 or less; and in formula (3b), a" and b" are each independently an integer of 0 or more and 30 or less, and c" and d" are each independently an integer of 1 or more and 300 or less. The occurrence order of each repeating unit enclosed in parentheses provided with a subscript a", b", c", or d" is not limited in the formulae.

From another viewpoint, the fluorine-containing oil may be a compound represented by general formula Rf$^3$—F wherein Rf$^3$ is a C$_{5-16}$ perfluoroalkyl group. The fluorine-containing oil may be a chlorotrifluoroethylene oligomer.

The fluorine-containing oil may have an average molecular weight of 500 to 10,000. The molecular weight of the fluorine-containing oil may be measured using gel permeation chromatography (GPC).

The fluorine-containing oil may be contained in an amount of, for example, 0 to 50 mass %, preferably 0 to 30 mass %, and more preferably 0 to 5 mass %, based on the composition of the present disclosure. In one embodiment, the composition of the present disclosure is substantially free of the fluorine-containing oil. Being substantially free of the fluorine-containing oil means that the fluorine-containing oil is not contained at all, or an extremely small amount of the fluorine-containing oil may be contained.

The fluorine-containing oil contributes to increasing the surface slickness of a layer formed of the composition of the present disclosure.

For example, the silicone oil may be linear or cyclic silicone oil having 2,000 or fewer siloxane bonds. The linear silicone oil may be so-called straight silicone oil or modified silicone oil. Examples of the straight silicone oil include dimethyl silicone oil, methyl phenyl silicone oil, and methyl hydrogen silicone oil. Examples of the modified silicone oil include those obtained by modifying straight silicone oil with alkyl, aralkyl, polyether, higher fatty acid ester, fluoroalkyl, amino, epoxy, carboxyl, alcohol, or the like. Examples of the cyclic silicone oil include cyclic dimethylsiloxane oil.

In the composition of the present disclosure (for example, a surface-treating agent), such silicone oil may be contained in an amount of, for example, 0 to 300 parts by mass, and preferably 50 to 200 parts by mass, based on total 100 parts by mass of the fluoropolyether group-containing silane compound of the present disclosure (in the case of two or more kinds, the total thereof, and the same applies below).

Silicone oil contributes to increasing the surface slickness of the surface-treating layer.

Examples of the catalyst include acids (such as acetic acid and trifluoroacetic acid), bases (such as ammonia, triethylamine, and diethylamine), and transition metals (such as Ti, Ni, and Sn).

The catalyst promotes hydrolysis and dehydrative condensation of the fluoropolyether group-containing silane compound of the present disclosure, and promotes formation of a layer formed of the composition of the present disclosure (for example, a surface-treating agent).

Examples of other components include, in addition to those described above, tetraethoxysilane, methyltrimethoxysilane, 3-aminopropyltrimethoxysilane, 3-glycidoxypropyltrimethoxysilane, and methyltriacetoxysilane.

The composition of the present disclosure can be used as a surface-treating agent for surface treatment of a substrate.

The surface-treating agent of the present disclosure can be formed into pellets by impregnating with the composition a porous material such as a porous ceramic material or a metal fiber such as a fiber obtained by, for example, solidifying steel wool in a cotton-like form. Such pellets can be used in, for example, vacuum deposition.

Below, the article of the present disclosure will now be described.

The article of the present disclosure contains a substrate and a layer (such as a surface-treating layer) on the surface of the substrate, wherein the layer is formed of the fluoropolyether group-containing silane compound of the present disclosure or a surface-treating agent containing the fluoropolyether group-containing silane compound (hereinafter, these are simply referred to as "the surface-treating agent of the present disclosure" collectively).

The substrate usable herein may be composed of any suitable material such as glass, resin (which may be natural or synthetic resin such as a commonly used plastic material, and may be in the form of a plate, a film, or the like), metal, ceramics, semiconductors (such as silicon and germanium), fiber (such as woven fabric and nonwoven fabric), fur, leather, wood, pottery, stone, and building materials.

For example, when the article to be produced is an optical member, the material constituting the surface of the substrate may be a material for an optical member, such as glass or a transparent plastic. When the article to be produced is an optical member, some layer (or film) such as a hard coat layer or an antireflection layer may be formed on the surface (the outermost layer) of the substrate. The antireflection layer may be any of a single-layer antireflection layer and a multi-layer antireflection layer. Examples of inorganic substances usable in the antireflection layer include SiO$_2$, SiO, ZrO$_2$, TiO$_2$, TiO, Ti$_2$O$_3$, Ti$_2$O$_5$, Al$_2$O$_3$, Ta$_2$O$_5$, CeO$_2$, MgO, Y$_2$O$_3$, SnO$_2$, MgF$_2$, and WO$_3$. One of these inorganic substances may be used singly, or two or more may be used in combination (e.g., as a mixture). In the case of a multilayer antireflection layer, SiO$_2$ and/or SiO is preferably used in the outermost layer thereof. When the article to be produced is an optical glass component for a touch panel, a part of the surface of the substrate (glass) may have a transparent electrode such as a thin film in which indium tin oxide (ITO), indium zinc oxide, or the like is used. The substrate, according to its specific configuration or the like, may have an insulating layer, an adhesive layer, a protecting layer, a decorated frame layer (I—CON), an atomizing film layer, a hard coating layer, a polarizing film, a phase difference film, a liquid crystal display module, or the like.

The shape of the substrate is not limited. The surface region of the substrate on which a surface-treating layer is to be formed is at least a part of the substrate surface, and may be suitably determined according to the application, specific configuration, and the like of an article to be produced.

The substrate, or at least the surface portion thereof, may be composed of a material originally having a hydroxyl group. Examples of the material include glass as well as metal (in particular, base metal) wherein a natural oxidized film or a thermal oxidized film is formed on the surface, ceramics, semiconductors, and the like. Alternatively, when the substrate has an insufficient amount of a hydroxyl group or when the substrate originally does not have a hydroxyl group as in resin and the like, a pre-treatment may be performed on the substrate to thereby introduce or increase a hydroxyl group on the surface of the substrate. Examples of such a pre-treatment include a plasma treatment (e.g., corona discharge) and ion beam irradiation. The plasma treatment can be suitably utilized to not only introduce or increase a hydroxyl group on the substrate surface, but also clean the substrate surface (remove foreign matter and the like). Another example of such a pre-treatment includes a method wherein a monolayer of a surface adsorbent having a carbon-carbon unsaturated bonding group is formed on the surface of the substrate by a LB method (a Langmuir-Blodgett method), a chemical adsorption method, or the like beforehand, and, thereafter, cleaving the unsaturated bond under an atmosphere containing oxygen, nitrogen, or the like.

Alternatively, the substrate, or at least on a surface portion thereof, may be composed of a silicone compound having one or more other reactive groups such as a Si—H group, or a material containing alkoxysilane.

Then, a layer of the surface-treating agent of the present disclosure is formed on the surface of the substrate, this layer is post-treated as necessary, and thereby a layer is formed from the surface-treating agent of the present disclosure.

The layer of the surface-treating agent of the present disclosure can be formed by applying the above composition on the surface of the substrate such that the composition coats the surface. The coating method is not limited. For example, a wet coating method and a dry coating method can be used.

Examples of the wet coating method include dip coating, spin coating, flow coating, spray coating, roll coating, gravure coating, and similar methods.

Examples of the dry coating method include deposition (usually, vacuum deposition), sputtering, CVD, and similar methods. Specific examples of the deposition method (usually, a vacuum deposition method) include resistive heating, electron beam, high-frequency heating using microwave or the like, ion beam, and similar methods. Specific examples of the CVD method include plasma-CVD, optical CVD, thermal CVD, and similar methods.

Furthermore, coating by an atmospheric pressure plasma method can be performed.

When using the wet coating method, the surface-treating agent of the present disclosure may be applied to the substrate surface after being diluted with a solvent. From the viewpoint of the stability of the composition of the present disclosure and the volatility of solvents, the following solvents are preferably used: perfluoroaliphatic hydrocarbons having 5 to 12 carbon atoms (such as perfluorohexane, perfluoromethylcyclohexane, and perfluoro-1,3-dimethylcyclohexane); polyfluoroaromatic hydrocarbons (such as bis (trifluoromethyl)benzene); polyfluoroaliphatic hydrocarbons (such as $C_6F_{13}CH_2CH_3$ (such as Asahiklin (registered trademark) AC-6000 manufactured by Asahi Glass Co., Ltd., and 1,1,2,2,3,3,4-heptafluorocyclopentane (such as Zeorora (registered trademark) H manufactured by Zeon Corporation)); alkyl perfluoroalkyl ethers (the perfluoroalkyl group and the alkyl group may be linear or branched) such as hydrofluoroether (HFE) (such as perfluoropropylmethyl ether ($C_3F_7OCH_3$) (such as Novec (trademark) 7000 manufactured by Sumitomo 3M Limited), perfluorobutyl methyl ether ($C_4F_9OCH_3$) (such as Novec (trademark) 7100 manufactured by Sumitomo 3M Limited), perfluorobutyl ethyl ether ($C_4F_9OC_2H_5$) (such as Novec (trademark) 7200 manufactured by Sumitomo 3M Limited), and perfluorohexyl methyl ether ($C_2F_5CF(OCH_3)C_3F_7$) (such as Novec (trademark) 7300 manufactured by Sumitomo 3M Limited), or $CF_3CH_2OCF_2CHF_2$ (such as Asahiklin (registered trademark) AE-3000 manufactured by Asahi Glass Co., Ltd.)). One of these solvents can be used singly, or two or more can be used as a mixture. In particular, hydrofluoroether is preferable, and perfluorobutyl methyl ether ($C_4F_9OCH_3$) and/or perfluorobutyl ethyl ether ($C_4F_9OC_2H_5$) is particularly preferable.

When using the dry coating method, the surface-treating agent of the present disclosure may be directly subjected to the dry coating method, or may be diluted with the above solvent before being subjected to the dry coating method.

A layer of the surface-treating agent is preferably formed such that the surface-treating agent of the present disclosure coexists with a catalyst for hydrolysis and dehydrative condensation in the layer. Conveniently, in the case of a wet coating method, the surface-treating agent of the present disclosure is diluted with a solvent, and then, immediately before application to the substrate surface, a catalyst may be added to the diluted solution of the surface-treating agent of the present disclosure. In the case of a dry coating method, the surface-treating agent of the present disclosure to which a catalyst has been added is directly used in a deposition (usually vacuum deposition) treatment, or a pellet-like material may be used in a deposition (usually vacuum deposition) treatment, wherein the pellets are obtained by impregnating a porous body of metal such as iron or copper with the surface-treating agent of the present disclosure to which a catalyst has been added.

The catalyst may be any suitable acid or base. The acid catalyst may be, for example, acetic acid, formic acid, or trifluoroacetic acid. The base catalyst may be, for example, ammonia or organic amine.

In the above-described manner, a layer derived from the surface-treating agent of the present disclosure is formed on the substrate surface, and the article of the present disclosure is produced. The layer thus obtained has both high surface slickness and high friction durability. The layer may have not only high friction durability but also have, depending on the formulation of the surface-treating agent used, water-repellency, oil-repellency, antifouling properties (for example, preventing grime such as fingerprints from adhering), waterproof properties (preventing water from entering electronic components and the like), waterproof properties, surface slickness (or lubricity, such as removability by wiping of grime such as fingerprints, and excellent tactile sensations), and the like, and may be suitably used as a functional thin film.

That is to say, the present disclosure further relates to an optical material having the cured product in the outermost layer.

The optical material preferably includes a wide variety of optical materials in addition to optical materials relating to displays and the like as exemplified below: for example, displays such as cathode ray tubes (CRTs; e.g., PC monitors), liquid crystal displays, plasma displays, organic EL displays, inorganic thin-film EL dot matrix displays, rear projection displays, vacuum fluorescent displays (VFDs), field emission displays (FEDs); protective plates for such displays; and those obtained by performing an antireflection film treatment on their surfaces.

The article having a layer obtained according to the present disclosure may be, but is not limited to, an optical member. Examples of the optical member include lenses of glasses or the like; front surface protective plates, antireflection plates, polarizing plates, and anti-glare plates for displays such as PDPs and LCDs; touch panel sheets for devices such as mobile phones and personal digital assistants; disc surfaces of optical discs such as Blu-ray (registered trademark) discs, DVD discs, CD-Rs, and MOs; optical fibers; and display surfaces of watches and clocks.

The article having a layer obtained according to the present disclosure may be an automobile interior/exterior material. Examples of exterior materials include windows, light covers, and aftermarket camera covers. Examples of interior materials include instrument panel covers, navigation system touch panels, and decorative interior materials.

The article having a layer obtained according to the present disclosure may be medical equipment or a medical material.

The thickness of the layer is not limited. The thickness of the layer in the case of an optical member is in the range of 1 to 50 nm, 1 to 30 nm, and preferably 1 to 15 nm, from the viewpoint of optical performance, surface slickness, friction durability, and antifouling properties.

Embodiments have been described above, but it will be understood that various modifications can be made to embodiments and details without departing from the spirit and the scope of the claims.

EXAMPLES

The present disclosure will now be described more specifically by way of the Examples below, but the present disclosure is not limited to the Examples. In the Examples, all chemical formulae shown below indicate average compositions, and the occurrence order of repeating units (such as $(OCF_2CF_2)$ and $(OCF_2)$) constituting perfluoropolyether is not limited.

Synthetic Example 1

First, 4.0 g of $CF_3$—$(OCF_2CF_2)_m$—$(OCF_2)_n$—$CH_2OH$ (m≈18, n≈18) was dispersed in a mixed solvent of 3.0 g of 1,3-bis(trifluoromethyl)benzene and 2.0 g of diethylene glycol dimethyl ether. To the dispersion was added 0.4 g of sodium hydroxide, and the mixture was stirred at 80° C. for 2 hours. To the mixture was added dropwise 0.5 g of bromoacetic acid dissolved in 2.0 g of diethylene glycol dimethyl ether while vigorously stirring the mixture, and then the mixture was stirred at 80° C. for 3 hours. The end point of the reaction was confirmed by $^{19}$F-NMR according to that the chemical shift of —$CF_2$— at the hydroxyl group β position of $CF_3(OCF_2CF_2)_m$—$(OCF_2)_n$—$CH_2OH$ shifted to a low magnetic field, and by $^1$H-NMR according to that the methylene proton at the carbonyl group α position of bromoacetic acid shifted to a high magnetic field. The reaction solution, when being cooled to room temperature, separated into a liquid phase and a solid phase. After the liquid phase was removed, 10 g of AK-225 was added to the solid phase, and 10 g of a 10 wt % aqueous sulfuric acid solution was added while stirring the mixture. After being stirred for 20 minutes, the mixture was left to stand still, the lower phase was separated, and the separated lower phase was washed with water twice, dried over magnesium sulfate, and concentrated. The resulting concentrate was dissolved in perfluorohexane. The solution was washed with acetone three times, and thus a polyether group-containing compound (A) was obtained.

Polyether group-containing compound (A):

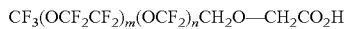

(m≈18, n≈18)

Synthetic Example 2

First, 3.0 g of the polyether group-containing compound (A) obtained in Synthetic Example 1 was dissolved in 5.0 g of 1,3-bis(trifluoromethyl)benzene, and ice-cooled. After 0.3 g of thionyl chloride was added dropwise to the solution, 0.01 mg of N,N-dimethylformamide was added, and the mixture was stirred at room temperature for 24 hours. After thionyl chloride was distilled off from this reaction solution, 0.18 g of diallylamine and 0.2 g of triethylamine were added, and the mixture was heated to 50° C. and stirred for 3 hours. The end point of the reaction was confirmed by $^{19}$F-NMR according to that the chemical shift of —$CF_2$— at the ether group β position of $CF_3$—$(OCF_2CF_2)_m$—$(OCF_2)_n$—$CH_2O$— shifted to a low magnetic field, and by $^1$H-NMR according to that the methylene proton at the amino group α-position of diallylamine shifted to a low magnetic field. The lower phase separated by adding 1 N hydrochloric acid to the reaction solution was washed with water, dried over magnesium sulfate, and concentrated. The resulting concentrate was dissolved in perfluorohexane and washed with acetone three times, and thus a polyether group-containing compound (B) was obtained.

Polyether group-containing compound (B):

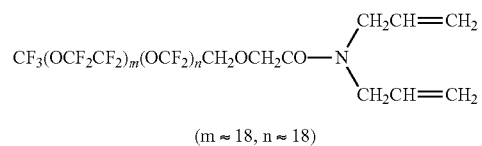

(m ≈ 18, n ≈ 18)

Synthetic Example 3

First, 3.0 g of the polyether group-containing compound (B) obtained in Synthetic Example 2 was dissolved in 6 g of 1,3-bis(trifluoromethyl)benzene, then 0.02 g of triacetoxymethylsilane and 0.04 ml of a xylene solution containing a 2% Pt complex of 1,3-divinyl-1,1,3,3-tetramethyldisiloxane were added, 0.8 g of trichlorosilane was added, and the mixture was stirred at 10° C. for 30 minutes. Subsequently, the resulting reaction solution was heated to 60° C. and stirred for 4 hours. Thereafter, volatiles were distilled off under reduced pressure, then a mixed solution of 0.1 g of methanol and 2.0 g of trimethyl orthoformate was added, and the mixture was heated to 60° C. and stirred for 3 hours. Thereafter, purification was performed, and thus 2.9 g of the following polyether group-containing compound (C) having trimethoxysilyl groups at terminals was obtained.

Polyether group-containing compound (C):

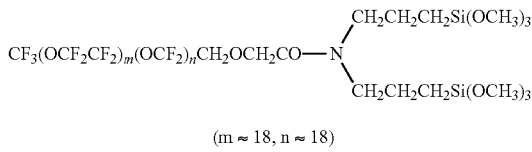

$(m \approx 18, n \approx 18)$

Synthetic Example 4

First, 4.0 g of $CF_3$—$(OCF_2CF_2)_m$—$(OCF_2)_n$—$CH_2OH$ ($m \approx 48$, $n \approx 18$) was dispersed in a mixed solvent of 3.0 g of 1,3-bis(trifluoromethyl)benzene and 2.0 g of diethylene glycol dimethyl ether. Then 0.4 g of sodium hydroxide was added, and the mixture was stirred at 80° C. for 2 hours. To the mixture was added dropwise 0.5 g of N,N'-diallyl-2-chloroacetic acid amide ($ClCH_2CON(CH_2CH=CH_2)_2$) dissolved in 2.0 g of diethylene glycol dimethyl ether while vigorously stirring the mixture, and then the mixture was stirred at 80° C. for 3 hours. The end point of the reaction was confirmed by $^{19}F$-NMR according to that the chemical shift of —$CF_2$— at the hydroxyl group β position of $CF_3(OCF_2CF_2)_m$—$(OCF_2)_n$—$CH_2OH$ shifted to a low magnetic field, and by $^1H$-NMR according to that the methylene proton at the carbonyl group α position of chloroacetic acid shifted to a high magnetic field. The reaction solution was cooled to room temperature, and 10 g of 1 N hydrochloric acid was added while stirring the solution. After being stirred for 5 minutes, the mixture was left to stand still, and the lower phase was separated, washed with water twice, dried over magnesium sulfate, and concentrated. The resulting concentrate was dissolved in perfluorohexane and washed with acetone three times, and thus a polyether group-containing compound (D) was obtained.

Polyether group-containing compound (D):

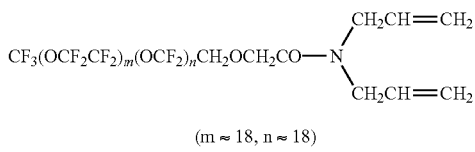

$(m \approx 18, n \approx 18)$

The same operations as in Synthetic Example 3 were carried out except that 3.0 g of the resulting polyether group-containing compound (D) was used, and thus 3.1 g of a polyether group-containing compound (E) was obtained.

Polyether group-containing compound (E):

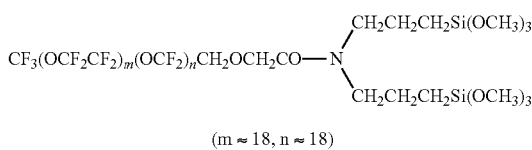

$(m \approx 18, n \approx 18)$

Synthetic Example 5

The same operations as in Synthetic Example 4 were carried out except that 6.0 g of $CF_3$—$(OCF_2CF_2)_m$—$(OCF_2)_n$—$CH_2OH$ ($m \approx 33$, $n \approx 32$) was used, and thus 5.8 g of a polyether group-containing compound (F) was obtained.

Polyether group-containing compound (F):

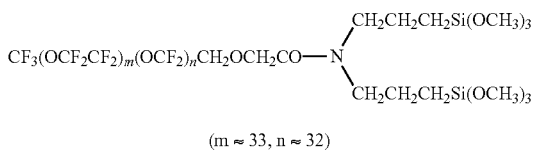

$(m \approx 33, n \approx 32)$

Synthetic Example 6

The same operations as in Synthetic Example 4 were carried out except that 6.0 g of $CF_3$—$(OCF_2CF_2)_m$—$(OCF_2)_n$—$CH_2OH$ ($m \approx 17$, $n \approx 29$) was used, and thus 6.1 g of a polyether group-containing compound (G) was obtained.

Polyether group-containing compound (G):

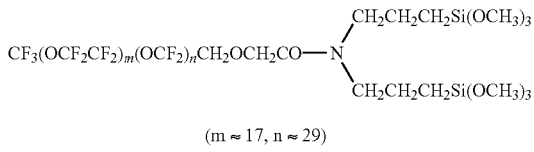

$(m \approx 17, n \approx 29)$

Example 1

The polyether group-containing compound (E) obtained in Synthetic Example 4 was dissolved in hydrofluoroether (Novec HFE-7200, manufactured by 3M) so as to have a concentration of 0.1 mass %, and thus a surface-treating agent (1) was prepared.

Example 2

The polyether group-containing compound (F) obtained in Synthetic Example 5 was dissolved in hydrofluoroether (Novec HFE-7200, manufactured by 3M) so as to have a concentration of 0.1 mass %, and thus a surface-treating agent (2) was prepared.

Example 3

The polyether group-containing compound (G) obtained in Synthetic Example 6 was dissolved in hydrofluoroether (Novec HFE-7200, manufactured by 3M) so as to have a concentration of 0.1 mass %, and thus a surface-treating agent (3) was prepared.

Comparative Examples 1 and 2

Comparative surface-treating agents (1) and (2) were prepared in the same manner as in Example 2 except that the following control compounds (1) and (2) were used, respectively, in place of the polyether group-containing compound (F).

Control Compound (1)

$CF_3CF_2CF_2$—$(OCF_2CF_2CF_2)_{23}$—$OCF_2CF_2CH_2OCH_2CH_2CH_2Si(OCH_3)_3$

-continued

Control Compound (2)

CF$_3$CF$_2$CF$_2$CF$_2$CF$_2$CF$_2$CH$_2$CH$_2$Si(OCH$_2$CH$_3$)$_3$ (Static Contact Angle)

The static contact angle was measured by the following method using a fully automatic contact angle meter Drop-Master 700 (manufactured by Kyowa Interface Science Co., Ltd.).
<Method for measuring static contact angle>
The static contact angle was obtained by dripping 2 μL of water from a microsyringe onto a horizontally placed substrate and taking a still image with a video microscope 1 second after the dripping.
(Formation of Cured Film)

The surface-treating agents (1) to (3) and the comparative surface-treating agents (1) to (2) were used to form cured films as follows (surface-treating layers).

A surface-treating agent or a comparative surface-treating agent was applied to a chemically tempered glass ("Gorilla" glass, manufactured by Corning Incorporated, thickness 0.7 mm) using a spin coater.
The spin coating conditions were 300 rpm for 3 seconds and 2,000 rpm for 30 seconds.
The coated glass was heated at 150° C. for 30 minutes in a thermostatic oven in air to form a cured film.
[Evaluation of Cured Film Properties]

Properties of the resulting cured film were evaluated as follows.
<Static Contact Angle>
(Initial Evaluation)

First, as an initial evaluation, after the formation of the cured film, the static water contact angle of the surface with which nothing had been brought into contact yet was measured.
(Evaluation After Wiping with Ethanol)

The cured film was wiped back and forth five times with Kimwipe (trade name, manufactured by Jujo Kimberly Co., Ltd.) sufficiently soaked with ethanol, and dried. The static water contact angle of the cured film after being dried was measured.

<Fingerprint Adherability and Removability by Wiping>
(Fingerprint Adherability)

A finger was pressed against a cured film formed using a surface-treating agent or a comparative surface-treating agent, and how easily a fingerprint adhered was visually judged. Evaluations were made according to the following criteria:
  A: Fingerprint unlikely adhered, or not noticeable even when adhered.
  B: Adhered fingerprint was little, but fingerprint sufficiently confirmed.
  C: Fingerprint adhered as clearly as fingerprint on untreated glass substrate.
(Fingerprint Removability by Wiping)

After the fingerprint adherability test, the adhered fingerprint was wiped back and forth five times with Kimwipe (trade name, manufactured by Jujo Kimberly Co., Ltd.), and how easily the adhered fingerprint was wiped off was visually judged. Evaluations were made according to the following criteria:
  A: Fingerprint completely wiped off.
  B: Fingerprint wiping marks remained.
  C: Fingerprint wiping marks spread, and difficult to remove.

The results of the series of evaluations are summarized in Table 1 below.

TABLE 1

| Treating agent | | Contact angle (degree) | | Fingerprint adherability and removability by wiping | |
| --- | --- | --- | --- | --- | --- |
| | | Initial evaluation | After wiping with ethanol | Fingerprint adherability | Fingerprint removability by wiping |
| Surface-treating agent (1) | Example 1 | 113 | 113 | A | A |
| Surface-treating agent (2) | Example 2 | 114 | 114 | A | A |
| Surface-treating agent (3) | Example 3 | 115 | 115 | A | A |
| Comparative surface-treating agent (1) | Comparative Example 1 | 113 | 112 | A | B |
| Comparative surface-treating agent (2) | Comparative Example 2 | 105 | 103 | B | C |

The contact angles of the cured films formed using the surface-treating agents (1) to (3) did not decrease even when the films were wiped using ethanol. On the other hand, the contact angles of the cured films formed using the comparative surface-treating agents (1) and (2) decreased when the films were wiped using ethanol. This is considered to be because the cured films formed of the comparative surface-treating agents (1) and (2) have poor chemical resistance (durability against solvent).

[Evaluation of Friction Durability of Cured Films]

The friction durability of the resulting cured films was evaluated as follows.
<Eraser Friction Durability Test>

Using a rubbing tester (manufactured by Shinto Scientific Co., Ltd.), the contact angle with water was measured every 2,500 times of rubbing under the following conditions, and the test was continued until reaching 10,000 times or a contact angle of less than 100 degrees. The test environment conditions were 25° C. and a humidity of 40% RH.

Eraser: Raber Eraser (manufactured by Minoan)
Ground contact area: 6 mmφ
Travel distance (one way): 30 mm
Travel speed: 3,600 mm/min
Load: 1 kg/6 mmφ

The results of the above evaluation are summarized in Table 2 below. In the table, "-" means that no measurement was performed.

TABLE 2

| Treating agent | | Number of times eraser was rubbed | | | | |
|---|---|---|---|---|---|---|
| | | 0 times | 2,500 times | 5,000 times | 7,500 times | 10,000 times |
| Surface-treating agent (1) | Example 1 | 113 | 113 | 112 | 110 | 105 |
| Surface-treating agent (2) | Example 2 | 114 | 113 | 111 | 108 | 106 |
| Surface-treating agent (3) | Example 3 | 115 | 114 | 112 | 109 | 101 |
| Comparative surface-treating agent (1) | Comparative Example 1 | 113 | 89 | — | — | — |

[1]. A fluoropolyether group-containing compound of formula (1) or (2) below:

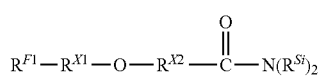  (1)

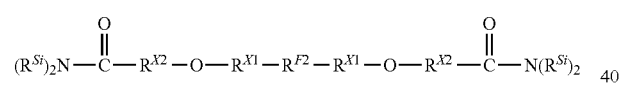  (2)

wherein
$R^{F1}$ is $R^{f1}\text{-}R^F\text{-}O_q\text{—}$;
$R^{F2}$ is $\text{-}R^{f2}_p\text{-}R^F\text{-}O_q\text{—}$;
$R^{f1}$ is a $C_{1\text{-}16}$ alkyl group optionally substituted with one or more fluorine atoms;
$R^{f2}$ is a $C_{1\text{-}6}$ alkylene group optionally substituted with one or more fluorine atoms;
$R^F$ is each independently at each occurrence a group represented by formula:

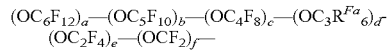

a, b, c, d, e, and f are each independently an integer of 0 to 200, and the sum of a, b, c, d, e, and f is 1 or more, and the occurrence order of each repeating unit enclosed in parentheses provided with a, b, c, d, e, or f is not limited in the formula;
$R^{Fa}$ is each independently at each occurrence a hydrogen atom, a fluorine atom, or a chlorine atom;
p is 0 or 1;
q is independently 0 or 1;
$R^{X1}$ is each independently at each occurrence a $C_{1\text{-}6}$ alkylene group;
$R^{X2}$ is each independently at each occurrence a $C_{1\text{-}6}$ alkylene group optionally substituted with a $C_{1\text{-}6}$ alkyl group or cyclic alkyl group optionally containing one or more nitrogen atoms, oxygen atoms, sulfur atoms, or silicon atoms, or with a perfluoroalkyl group;
$R^{Si}$ is each independently at each occurrence represented by formula (S1) below:

  (S1)

$X^1$ is each independently at each occurrence a single bond, an oxygen atom, or a divalent organic group;
$R^{a1}$ is each independently at each occurrence $-Z^{1'}-SiR^{a1'}_{p1'}R^{b1'}_{q1'}R^{c1'}_{r1'}$;
$Z^{1'}$ is each independently at each occurrence a single bond, an oxygen atom, or a divalent organic group; $R^{a1'}$ is each independently at each occurrence $-Z^{1''}-SiR^{a1''}_{p1''}R^{b1''}_{q1''}R^{c1''}_{r1''}$;
$Z^{1''}$ is each independently at each occurrence a single bond, an oxygen atom, or a divalent organic group;
$R^{a1''}$ is each independently at each occurrence $-Z^{1'''}-SiR^{b1'''}_{q1'''}R^{c1'''}_{r1'''}$;
$Z^{1'''}$ is each independently at each occurrence a single bond, an oxygen atom, or a divalent organic group;
$R^{b1'''}$ is each independently at each occurrence a hydroxyl group or a hydrolyzable group;
$R^{c1'''}$ is each independently at each occurrence a hydrogen atom or a monovalent organic group;
$q1'''$ is each independently at each occurrence an integer of 0 to 3;
$r1'''$ is each independently at each occurrence an integer of 0 to 3;
$R^{b1''}$ is each independently at each occurrence a hydroxyl group or a hydrolyzable group;
$R^{c1''}$ is each independently at each occurrence a hydrogen atom or a monovalent organic group;
$p1''$ is each independently at each occurrence an integer of 0 to 3;
$q1''$ is each independently at each occurrence an integer of 0 to 3;
$r1''$ is each independently at each occurrence an integer of 0 to 3;
$R^{b1'}$ is each independently at each occurrence a hydroxyl group or a hydrolyzable group;
$R^{c1'}$ is each independently at each occurrence a hydrogen atom or a monovalent organic group;
$p1'$ is each independently at each occurrence an integer of 0 to 3;
$q1'$ is each independently at each occurrence an integer of 0 to 3;
$r1'$ is each independently at each occurrence an integer of 0 to 3;

$R^{b1}$ is each independently at each occurrence a hydroxyl group or a hydrolyzable group;

$R^{c1}$ is each independently at each occurrence a hydrogen atom or a monovalent organic group;

p1 is each independently at each occurrence an integer of 0 to 3;

q1 is each independently at each occurrence an integer of 0 to 3;

r1 is each independently at each occurrence an integer of 0 to 3; and at least one $R^{b1}$, $R^{b1'}$, $R^{b1''}$, or $R^{b1'''}$ is present for each group represented by $R^{Si}$.

[2]. The fluoropolyether group-containing compound according to [1], wherein p1 is 0, and q1 is 2 or 3.

[3]. The fluoropolyether group-containing compound according to [1] or [2], wherein $R^{Fa}$ is a fluorine atom.

[4]. The fluoropolyether group-containing compound according to any one of [1] to [3], wherein $X^1$ is each independently at each occurrence a divalent organic group.

5. The fluoropolyether group-containing compound according to any one of [1] to [4], wherein $X^1$ is each independently at each occurrence $-(Z^{21})_{z11}-(X^2)_{z12}-(Z^{22})_{z13}-$ wherein $Z^{21}$ and $Z^{22}$ are a divalent organic group;

$X^2$ is an oxygen atom;

z11 is 0 or 1;

z12 is 0 or 1;

z13 is 0 or 1; and at least one of z11 and z13 is 1.

[6]. The fluoropolyether group-containing compound according to any one of [1] to [5], wherein $X^1$ is each independently at each occurrence an alkylene group.

[7]. A surface-treating agent comprising the fluoropolyether group-containing compound according to any one of [1] to [6].

[8]. The surface-treating agent according to [7], further comprising one or more other components selected from a fluorine-containing oil, a silicone oil, and a catalyst.

[9]. The surface-treating agent according to [7] or [8], further comprising a solvent.

[10]. The surface-treating agent according to any one of [7] to [9], which is used as an antifouling coating agent or a water-proof coating agent.

[11]. The surface-treating agent according to any one of [7] to [10], which is for vacuum deposition.

[12]. A pellet comprising the surface treatment agent according to any one of [7] to [10].

[13]. An article comprising a substrate and a layer on a surface of the substrate, wherein the layer is formed of the compound according to any one of [1] to [6] or the surface-treating agent according to any one of [7] to [11].

[14]. The article according to [13], which is an optical member.

INDUSTRIAL APPLICABILITY

The fluoropolyether group-containing compound of the present disclosure can be suitably used to form a surface-treating layer on the surfaces of a wide variety of substrates or, in particular, optical members that require friction durability.

The invention claimed is:

1. A composition containing a fluoropolyether group-containing compound of formula (1) and a fluoropolyether group-containing compound of formula (2) below:

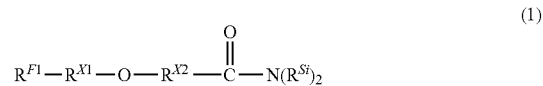

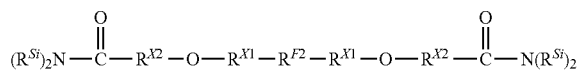

wherein $R^{F1}$ is $R^{f1}-R^F-O_q-$;

$R^{F2}$ is $-R^{f2}_p-R^F-O_q-$;

$R^{f1}$ is a $C_{1-16}$ alkyl group optionally substituted with one or more fluorine atoms;

$R^{f2}$ is a $C_{1-6}$ alkylene group optionally substituted with one or more fluorine atoms;

$R^F$ is each independently at each occurrence a group represented by formula:

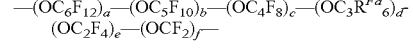

a, b, c, d, e, and f are each independently an integer of 0 to 200, and the sum of a, b, c, d, e, and f is 1 or more, and the occurrence order of each repeating unit enclosed in parentheses provided with a, b, c, d, e, or f is not limited in the formula;

$R^{Fa}$ is each independently at each occurrence a hydrogen atom, a fluorine atom, or a chlorine atom;

p is 0 or 1;

q is independently 0 or 1;

$R^{X1}$ is each independently at each occurrence a $C_{1-6}$ alkylene group;

$R^{X2}$ is each independently at each occurrence a $C_{1-6}$ alkylene group optionally substituted with a $C_{1-6}$ alkyl group or cyclic alkyl group optionally containing one or more nitrogen atoms, oxygen atoms, sulfur atoms, or silicon atoms, or with a perfluoroalkyl group;

$R^{Si}$ is each independently at each occurrence represented by formula (S1) below:

(S1)

$X^1$ is each independently at each occurrence a single bond, an oxygen atom, or a divalent organic group;

$R^{a1}$ is each independently at each occurrence -$Z^{1'}$-SiR$^{a1'}_{p1}$R$^{b1'}_{q1}$R$^{c1'}_{r1'}$;

$Z^{1'}$ is each independently at each occurrence a single bond, an oxygen atom, or a divalent organic group;

$R^{a1'}$ is each independently at each occurrence -$Z^{1'}$-SiR$^{a1'}_{p1}$R$^{b1'}_{q1}$R$^{c1'}_{r1'}$;

$Z^{1'}$ is each independently at each occurrence a single bond, an oxygen atom, or a divalent organic group;

$R^{a1'}$ is each independently at each occurrence -$Z^{1'''}$-SiR$^{a1'''}_{p1'''}$SiR$^{b1'''}_{q1'''}$-R$^{c1'''}_{r1'''}$;

$Z^{1'''}$ is each independently at each occurrence a single bond, an oxygen atom, or a divalent organic group;

$R^{b1'''}$ is each independently at each occurrence a hydroxyl group or a hydrolyzable group;

$R^{c1'''}$ is each independently at each occurrence a hydrogen atom or a monovalent organic group;

$q1'''$ is each independently at each occurrence an integer of 0 to 3;

$r1'''$ is each independently at each occurrence an integer of 0 to 3;

$R^{b1''}$ is each independently at each occurrence a hydroxyl group or a hydrolyzable group;

$R^{c1''}$ is each independently at each occurrence a hydrogen atom or a monovalent organic group;

$p^{1'''}$ is each independently at each occurrence an integer of 0 to 3;

$q^{1'''}$ is each independently at each occurrence an integer of 0 to 3;

$r^{1'''}$ is each independently at each occurrence an integer of 0 to 3;

$R^{b1''}$ is each independently at each occurrence a hydroxyl group or a hydrolyzable group;

$R^{c1''}$ is each independently at each occurrence a hydrogen atom or a monovalent organic group;

$p^{1''}$ is each independently at each occurrence an integer of 0 to 3;

$q^{1''}$ is each independently at each occurrence an integer of 0 to 3;

$r^{1''}$ is each independently at each occurrence an integer of 0 to 3;

$R^{b1'}$ is each independently at each occurrence a hydroxyl group or a hydrolyzable group;

$R^{c1'}$ is each independently at each occurrence a hydrogen atom or a monovalent organic group;

$p^1$ is each independently at each occurrence an integer of 0 to 3;

$q^1$ is each independently at each occurrence an integer of 0 to 3;

$r^1$ is each independently at each occurrence an integer of 0 to 3; and at least one $R^{b1}$, $R^{b1'}$, $R^{b1''}$, or $R^{b1'''}$ is present for each group represented by $R^{Si}$.

2. The composition according to claim 1, wherein $p^1$ is 0, and $q^1$ is 2 or 3.

3. The composition according to claim 1, wherein $R^{Fa}$ is a fluorine atom.

4. The composition according to claim 1, wherein $X^1$ is each independently at each occurrence a divalent organic group.

5. The composition according to claim 1, wherein $X^1$ is each independently at each occurrence $-(Z^{21})_{z11}-(X^2)_{z12}-(Z^{22})_{z13}-$ wherein $Z^{21}$ and $Z^{22}$ are a divalent organic group;

$X^2$ is an oxygen atom;

z11 is 0 or 1;

z12 is 0 or 1;

z13 is 0 or 1; and at least one of z11 and z13 is 1.

6. The composition according to claim 1, wherein $X^1$ is each independently at each occurrence an alkylene group.

7. The composition according to claim 1, wherein a molar ratio of the fluoropolyether group-containing compound of formula (2) to a total of the fluoropolyether group-containing compounds of formulae (1) and (2) contained in the composition is 0.001 to 0.35.

* * * * *